(12) United States Patent
Bagley, Jr. et al.

(10) Patent No.: US 11,232,262 B2
(45) Date of Patent: Jan. 25, 2022

(54) METHOD, SYSTEM, AND COMPUTER PROGRAM PRODUCT FOR AN INTELLIGENT INDUSTRIAL ASSISTANT

(71) Applicant: iT SpeeX LLC, Wilmington, DE (US)

(72) Inventors: Ronald D. Bagley, Jr., Hidden Valley, PA (US); Thomas John Kuhnell, Blue Ash, OH (US); Kyle David Steinfort, Mason, OH (US)

(73) Assignee: IT SpeeX LLC, Wilmington, DE (US)

( * ) Notice: Subject to any disclaimer, the term of this patent is extended or adjusted under 35 U.S.C. 154(b) by 0 days.

(21) Appl. No.: 16/513,015

(22) Filed: Jul. 16, 2019

(65) Prior Publication Data

US 2020/0026757 A1    Jan. 23, 2020

Related U.S. Application Data

(60) Provisional application No. 62/803,018, filed on Feb. 8, 2019, provisional application No. 62/699,336, filed on Jul. 17, 2018.

(51) Int. Cl.
*G06F 40/30* (2020.01)

(52) U.S. Cl.
CPC .................... *G06F 40/30* (2020.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795

USPC ............................................................ 704/9
See application file for complete search history.

(56) References Cited

U.S. PATENT DOCUMENTS

| 4,462,080 A | | 7/1984 | Johnstone et al. |
| 5,369,575 A | * | 11/1994 | Lamberti ............... G06F 40/253 704/9 |
| 5,675,752 A | * | 10/1997 | Scott ..................... G11B 27/034 715/866 |

(Continued)

FOREIGN PATENT DOCUMENTS

| CN | 100470420 C | 3/2009 |
| CN | 104636323 B | 4/2018 |

(Continued)

OTHER PUBLICATIONS

Kjeldskov et al., Designing a Mobile Communicator: Combining Ethnography and Object-Oriented Design, 2006 ACM, pp. 95-102 (Year: 2006).*

*Primary Examiner* — Lamont M Spooner
(74) *Attorney, Agent, or Firm* — The Webb Law Firm

(57) ABSTRACT

Provided is a method for using an intelligent industrial assistant. The method may include receiving package data comprising at least one dialogue template. A natural language input may be received from a user. At least a portion of the natural language input may be mapped to a first dialogue template of the at least one dialogue template. At least one command may be determined based on the first dialogue template. Command data associated with the at least one command may be communicated. A system and computer program product are also disclosed.

19 Claims, 9 Drawing Sheets

(56) References Cited

U.S. PATENT DOCUMENTS

| | | | |
|---|---|---|---|
| 5,774,841 | A | 6/1998 | Salazar et al. |
| 6,757,362 | B1 | 6/2004 | Cooper et al. |
| 6,895,380 | B2 | 5/2005 | Sepe, Jr. |
| 6,907,317 | B2 | 6/2005 | Peshkin et al. |
| 6,912,428 | B2 | 6/2005 | Nakai et al. |
| 6,928,336 | B2 | 8/2005 | Peshkin et al. |
| 7,100,123 | B1* | 8/2006 | Todd ................... G06F 16/30 715/862 |
| 7,120,508 | B2 | 10/2006 | Peshkin et al. |
| 7,245,990 | B2 | 7/2007 | Watanabe et al. |
| 7,920,678 | B2 | 4/2011 | Cooper et al. |
| 8,000,453 | B2 | 8/2011 | Cooper et al. |
| 8,196,155 | B2 | 6/2012 | Huang et al. |
| 9,082,239 | B2 | 7/2015 | Ricci |
| 9,826,599 | B2 | 11/2017 | Banta |
| 9,830,044 | B2 | 11/2017 | Brown et al. |
| 9,966,065 | B2 | 5/2018 | Gruber et al. |
| 2002/0103809 | A1* | 8/2002 | Starzl .................. G06F 16/951 |
| 2003/0050800 | A1* | 3/2003 | Brandt ................... G06F 8/34 705/2 |
| 2004/0034532 | A1 | 2/2004 | Mukhopadhyay et al. |
| 2004/0122655 | A1* | 6/2004 | Yamakawa ........... G06F 40/279 704/4 |
| 2004/0215706 | A1* | 10/2004 | Lavender ................ G06F 3/123 709/201 |
| 2005/0005266 | A1* | 1/2005 | Datig ..................... G06N 5/02 717/136 |
| 2007/0078658 | A1* | 4/2007 | Virji ...................... G10L 15/26 704/275 |
| 2008/0163054 | A1* | 7/2008 | Pieper ................... G06T 13/40 715/706 |
| 2012/0257876 | A1* | 10/2012 | Gupta .................. G11B 27/28 386/285 |
| 2012/0265528 | A1* | 10/2012 | Gruber .................. G10L 15/183 704/235 |
| 2013/0027421 | A1* | 1/2013 | Bala ..................... H04N 1/6033 345/594 |
| 2013/0117249 | A1* | 5/2013 | Jones ................. G06F 16/3322 707/706 |
| 2013/0253929 | A1* | 9/2013 | Weider ................ G10L 15/1815 704/235 |
| 2013/0317816 | A1 | 11/2013 | Potter |
| 2014/0040748 | A1* | 2/2014 | Lemay ................. G06Q 10/107 715/728 |
| 2014/0185084 | A1* | 7/2014 | Cudak .................... G06F 3/126 358/1.15 |
| 2015/0121216 | A1 | 4/2015 | Brown et al. |
| 2015/0242391 | A1* | 8/2015 | Goel ...................... G06F 40/30 704/9 |
| 2015/0278370 | A1 | 10/2015 | Stratvert et al. |
| 2015/0279360 | A1* | 10/2015 | Mengibar ........... G10L 15/1815 704/257 |
| 2016/0257000 | A1* | 9/2016 | Guerin ................... B25J 9/1605 |
| 2016/0321283 | A1* | 11/2016 | Shen ................ G06Q 10/06313 |
| 2016/0323398 | A1* | 11/2016 | Guo ................. G06Q 10/06313 |
| 2016/0349935 | A1* | 12/2016 | Gelfenbeyn ....... G06Q 30/0601 |
| 2017/0038763 | A1 | 2/2017 | Brown et al. |
| 2017/0041388 | A1* | 2/2017 | Tal ........................ G06F 40/279 |
| 2017/0068550 | A1 | 3/2017 | Zeitlin |
| 2017/0070783 | A1* | 3/2017 | Printz .................... G06F 16/44 |
| 2017/0102966 | A1* | 4/2017 | Dallala .................. G06F 9/4843 |
| 2017/0180462 | A1* | 6/2017 | Leonelli .................... G06F 8/35 |
| 2017/0278000 | A1 | 9/2017 | Kohlhepp |
| 2017/0310663 | A1* | 10/2017 | Krishan ................ H04L 63/083 |
| 2018/0054850 | A1* | 2/2018 | Leonelli .................. H04W 4/70 |
| 2018/0089736 | A1* | 3/2018 | Raravi ................ G06Q 30/0257 |
| 2018/0129181 | A1* | 5/2018 | Kratzer, III ............. H04L 67/10 |
| 2019/0034542 | A1* | 1/2019 | Ming ...................... G10L 15/22 |
| 2019/0279625 | A1* | 9/2019 | Huang ................ G06F 3/04847 |

FOREIGN PATENT DOCUMENTS

| | | |
|---|---|---|
| EP | 1973072 A1 | 9/2008 |
| EP | 3016104 A1 | 5/2016 |
| EP | 3185094 A1 | 12/2016 |
| EP | 3173983 A1 | 5/2017 |
| EP | 3244301 A1 | 11/2017 |
| EP | 2140370 B1 | 12/2018 |
| TW | 201543240 A | 11/2015 |
| WO | 0109724 A1 | 2/2001 |
| WO | 0156016 A1 | 8/2001 |
| WO | 2007025052 A2 | 3/2007 |
| WO | 2007052285 A2 | 5/2007 |
| WO | 2011163062 A2 | 12/2011 |
| WO | 2014197126 A1 | 12/2014 |
| WO | 2015126718 A1 | 8/2015 |

* cited by examiner

METHOD, SYSTEM, AND COMPUTER PROGRAM PRODUCT FOR AN INTELLIGENT INDUSTRIAL ASSISTANT

CROSS-REFERENCE TO RELATED APPLICATIONS

This application claims priority to U.S. Provisional Patent Application No. 62/699,336, filed Jul. 17, 2018, and U.S. Provisional Patent Application No. 62/803,018, filed Feb. 8, 2019, the disclosures of which are hereby incorporated by reference in their entireties.

BACKGROUND

1. Field

This disclosed subject matter relates generally to methods, systems, and products for an intelligent assistant and, in some particular embodiments, to a method, system, and computer program product for an intelligent industrial assistant.

2. Technical Considerations

Users of certain machines (e.g., operators of industrial machines and/or the like) may be trained to use such machines. For example, each machine may be usable (e.g., controllable and/or the like) via a physical interface (e.g., keyboard, keypad, and/or the like) integrated with the machine. Such interfaces may vary based on the type of machine, e.g., based on the manufacturer, third party controller/interface provider, model, and/or the like associated with such machine.

However, training to use such interfaces may be time consuming. Additionally, manual efforts (e.g., multiple key strokes, clicks, and/or the like), time, and/or the like may be required to use (e.g., control and/or the like) such machines via such interfaces. Moreover, a user (e.g., machine operator and/or the like) may not be able to control other machines (e.g., separate industrial machine on a factory floor, newly acquired industrial machine, upgraded industrial machine, and/or the like) without separately learning (e.g., being trained on and/or the like) the interfaces of such other machines. Even if a user did know how to use multiple machines, it may require manual efforts and time to move between machines, and/or such a user may not be able to monitor multiple separate machines simultaneously. Further, if a user's hands are occupied (e.g., carrying an object, writing notes, assisting another individual on the factory floor, and/or the like), such a user may not be able to suitably manipulate the interface of the machine. In addition, if such an interface includes only visual indications of status or other information (e.g., display screen, indicator lights, and/or the like), a user may not be able to adequately be able to receive such indications of status or other information while looking elsewhere (e.g., looking at anything else that may be anywhere else on a factory floor).

SUMMARY

Accordingly, it is an object of the presently disclosed subject matter to provide methods, systems, and computer program products for an intelligent industrial assistant.

According to non-limiting embodiments, provided is a method for using an intelligent industrial assistant. In some non-limiting embodiments, a method for using an intelligent industrial assistant may include receiving, by the intelligent industrial assistant, package data. The package data may include at least one dialogue template. The intelligent industrial assistant may receive a natural language input from a user. The intelligent industrial assistant may map at least a portion of the natural language input to a first dialogue template of the dialogue template(s). The intelligent industrial assistant may determine at least one command based on the first dialogue template. The intelligent industrial assistant may communicate command data associated with the command(s).

In some non-limiting embodiments, the intelligent industrial assistant may receive response data in response to the command data. Additionally or alternatively, the intelligent industrial assistant may communicate a response to the user based on the response data. In some non-limiting embodiments, a user device may display a dialogue window. Additionally or alternatively, the dialogue window may include text of the natural language input and text of the response.

In some non-limiting embodiments, the package data may include at least one industrial machine interface including a first industrial machine interface for a first industrial machine. Additionally or alternatively, the first dialogue template may be associated with at least one executable industrial machine operation. Additionally or alternatively, the command data may be associated with the at least one executable industrial machine operation. Additionally or alternatively, communicating the command data may include transmitting, by the intelligent industrial assistant, the command data via the first industrial machine interface to the first industrial machine.

In some non-limiting embodiments, the package data may include at least one database interface including a first database interface for a first database. Additionally or alternatively, the first dialogue template may be associated with retrievable data. Additionally or alternatively, the command data may be associated with the retrievable data. Additionally or alternatively, communicating the command data may include transmitting, by the intelligent industrial assistant, the command data via the first database interface to the first database.

In some non-limiting embodiment, the at least one dialogue template may include a plurality of dialogue templates. Additionally or alternatively, the intelligent industrial assistant may select the first dialogue template from the plurality of dialogue templates based on the first natural language input.

In some non-limiting embodiments, the intelligent industrial assistant may determine the natural language input is insufficient to map to a portion of the first dialogue template. Additionally or alternatively, the intelligent industrial assistant may communicate a prompt requesting additional input to the user. Additionally or alternatively, the intelligent industrial assistant may receive a second natural language input form the user. Additionally or alternatively, the intelligent industrial assistant may map at least a portion of the second natural language input to the portion of the first dialogue template.

In some non-limiting embodiments, the intelligent industrial assistant may communicate a prompt requesting confirmation for the at least one command to the user based on the first dialogue template. Additionally or alternatively, the intelligent industrial assistant may receive a second natural language input from the user. Additionally or alternatively, the intelligent industrial assistant may determine the user has confirmed the at least one command based on the second natural language input.

In some non-limiting embodiments, the package data may include at least one of a media item, a tabular list, a report template, a machine interface, a database interface, a combination thereof, and/or the like. In some non-limiting embodiments, the media item may include at least one of a user manual, a video recording, an audio recording, a combination thereof, and/or the like. In some non-limiting embodiments, the user manual may include a plurality of media markers. Additionally or alternatively, the first dialogue template may be associated with at least one media marker of the plurality of media markers. Additionally or alternatively, the command data may be associated with the at least one media marker of the plurality of media markers. Additionally or alternatively, communicating the command data may include transmitting, by the intelligent industrial assistant, the command data to a user device to display the at least one media marker of the user manual.

In some non-limiting embodiments, the package data may include the tabular list. Additionally or alternatively, the first dialogue template may be associated with at least one field of the tabular list. Additionally or alternatively, the command data may be associated with the at least one field of the tabular list. Additionally or alternatively, communicating the command data may include transmitting, by the intelligent industrial assistant, the command data to a user device to display the at least one field of the tabular list.

In some non-limiting embodiments, the package data may include a first industrial machine interface of a first industrial machine. Additionally or alternatively, the first industrial machine interface may include an application programming interface (API) associated with a dynamic load library (DLL) of the first machine.

In some non-limiting embodiments, the package data may include a first report template. Additionally or alternatively, the first report template may include at least one of a history field, a filtering field, a statistics field, a calculation field, a warning field, an alarm field, a machine status field, a combination thereof, and/or the like.

According to non-limiting embodiments, provided is a system for using an intelligent industrial assistant. In some non-limiting embodiments, the system for using an intelligent industrial assistant may include at least one processor and at least one non-transitory computer readable medium, which may include instructions to direct the at least one processor to receive, via a decision engine of an intelligent industrial assistant, package data, which may include at least one dialogue template. A dialogue manager of the intelligent industrial assistant may receive a natural language input from a user. The decision engine of the intelligent industrial assistant may map at least a portion of the natural language input to a first dialogue template of the dialogue template(s). The decision engine of the intelligent industrial assistant may determine at least one command based on the first dialogue template. The decision engine of the intelligent industrial assistant may communicate command data associated with the at least one command.

In some non-limiting embodiments, the intelligent industrial assistant (e.g., the decision engine thereof) may receive response data in response to the command data. Additionally or alternatively, the intelligent industrial assistant (e.g., the dialogue manager thereof, the decision engine thereof, and/ or the like) may communicate a response to the user based on the response data. In some non-limiting embodiments, a user device may display a dialogue window. Additionally or alternatively, the dialogue window may include text of the natural language input and text of the response.

In some non-limiting embodiments, the package data may include at least one industrial machine interface including a first industrial machine interface for a first industrial machine. Additionally or alternatively, the first dialogue template may be associated with at least one executable industrial machine operation. Additionally or alternatively, the command data may be associated with the at least one executable industrial machine operation. Additionally or alternatively, communicating the command data may include transmitting, by the intelligent industrial assistant (e.g., the decision engine thereof), the command data via the first industrial machine interface to the first industrial machine.

In some non-limiting embodiments, the package data may include at least one database interface including a first database interface for a first database. Additionally or alternatively, the first dialogue template may be associated with retrievable data. Additionally or alternatively, the command data may be associated with the retrievable data. Additionally or alternatively, communicating the command data may include transmitting, by the intelligent industrial assistant (e.g., the decision engine thereof), the command data via the first database interface to the first database.

In some non-limiting embodiment, the at least one dialogue template may include a plurality of dialogue templates. Additionally or alternatively, the intelligent industrial assistant (e.g., the decision engine thereof, the dialogue manager thereof, and/or the like) may select the first dialogue template from the plurality of dialogue templates based on the first natural language input.

In some non-limiting embodiments, the intelligent industrial assistant (e.g., the decision engine thereof, the dialogue manager thereof, and/or the like) may determine the natural language input is insufficient to map to a portion of the first dialogue template. Additionally or alternatively, the intelligent industrial assistant (e.g., the decision engine thereof, the dialogue manager thereof, and/or the like) may communicate a prompt requesting additional input to the user. Additionally or alternatively, the intelligent industrial assistant (e.g., the dialogue manager thereof) may receive a second natural language input form the user. Additionally or alternatively, the intelligent industrial assistant (e.g., the decision engine thereof, the dialogue manager thereof, and/ or the like) may map at least a portion of the second natural language input to the portion of the first dialogue template.

In some non-limiting embodiments, the intelligent industrial assistant (e.g., the dialogue manager thereof) may communicate a prompt requesting confirmation for the at least one command to the user based on the first dialogue template. Additionally or alternatively, the intelligent industrial assistant (e.g., the dialogue manager thereof) may receive a second natural language input from the user. Additionally or alternatively, the intelligent industrial assistant (e.g., the decision engine thereof, the dialogue manager thereof, and/or the like) may determine the user has confirmed the at least one command based on the second natural language input.

In some non-limiting embodiments, the package data may include at least one of a media item, a tabular list, a report template, a machine interface, a database interface, a combination thereof, and/or the like. In some non-limiting embodiments, the media item may include at least one of a user manual, a video recording, an audio recording, a combination thereof, and/or the like. In some non-limiting embodiments, the user manual may include a plurality of media markers. Additionally or alternatively, the first dialogue template may be associated with at least one media marker of the plurality of media markers. Additionally or alternatively, the command data may be associated with the at least one media marker of the plurality of media markers. Additionally or alternatively, communicating the command data may include transmitting, by the intelligent industrial assistant (e.g., the decision engine thereof), the command data to a user device to display the at least one media marker of the user manual.

In some non-limiting embodiments, the package data may include the tabular list. Additionally or alternatively, the first dialogue template may be associated with at least one field of the tabular list. Additionally or alternatively, the command data may be associated with the at least one field of the tabular list. Additionally or alternatively, communicating the command data may include transmitting, by the intelligent industrial assistant (e.g., the decision engine thereof), the command data to a user device to display the at least one field of the tabular list.

In some non-limiting embodiments, the package data may include a first industrial machine interface of a first industrial machine. Additionally or alternatively, the first industrial machine interface may include an application programming interface (API) associated with a dynamic load library (DLL) of the first machine.

In some non-limiting embodiments, the package data may include a first report template. Additionally or alternatively, the first report template may include at least one of a history field, a filtering field, a statistics field, a calculation field, a warning field, an alarm field, a machine status field, a combination thereof, and/or the like.

According to non-limiting embodiments, provided is a computer program product for using an intelligent industrial assistant. The computer program product may include at least one non-transitory computer-readable medium including one or more instructions that, when executed by at least one processor, cause the at least one processor to receive, via a decision engine of an intelligent industrial assistant, package data, which may include at least one dialogue template. A dialogue manager of the intelligent industrial assistant may receive a natural language input from a user. The decision engine of the intelligent industrial assistant may map at least a portion of the natural language input to a first dialogue template of the dialogue template(s). The decision engine of the intelligent industrial assistant may determine at least one command based on the first dialogue template. The decision engine of the intelligent industrial assistant may communicate command data associated with the at least one command.

In some non-limiting embodiments, the intelligent industrial assistant (e.g., the decision engine thereof) may receive response data in response to the command data. Additionally or alternatively, the intelligent industrial assistant (e.g., the dialogue manager thereof, the decision engine thereof, and/or the like) may communicate a response to the user based on the response data. In some non-limiting embodiments, a user device may display a dialogue window. Additionally or alternatively, the dialogue window may include text of the natural language input and text of the response.

In some non-limiting embodiments, the package data may include at least one industrial machine interface including a first industrial machine interface for a first industrial machine. Additionally or alternatively, the first dialogue template may be associated with at least one executable industrial machine operation. Additionally or alternatively, the command data may be associated with the at least one executable industrial machine operation. Additionally or alternatively, communicating the command data may include transmitting, by the intelligent industrial assistant (e.g., the decision engine thereof), the command data via the first industrial machine interface to the first industrial machine.

In some non-limiting embodiments, the package data may include at least one database interface including a first database interface for a first database. Additionally or alternatively, the first dialogue template may be associated with retrievable data. Additionally or alternatively, the command data may be associated with the retrievable data. Additionally or alternatively, communicating the command data may include transmitting, by the intelligent industrial assistant (e.g., the decision engine thereof), the command data via the first database interface to the first database.

In some non-limiting embodiment, the at least one dialogue template may include a plurality of dialogue templates. Additionally or alternatively, the intelligent industrial assistant (e.g., the decision engine thereof, the dialogue manager thereof, and/or the like) may select the first dialogue template from the plurality of dialogue templates based on the first natural language input.

In some non-limiting embodiments, the intelligent industrial assistant (e.g., the decision engine thereof, the dialogue manager thereof, and/or the like) may determine the natural language input is insufficient to map to a portion of the first dialogue template. Additionally or alternatively, the intelligent industrial assistant (e.g., the decision engine thereof, the dialogue manager thereof, and/or the like) may communicate a prompt requesting additional input to the user. Additionally or alternatively, the intelligent industrial assistant (e.g., the dialogue manager thereof) may receive a second natural language input form the user. Additionally or alternatively, the intelligent industrial assistant (e.g., the decision engine thereof, the dialogue manager thereof, and/or the like) may map at least a portion of the second natural language input to the portion of the first dialogue template.

In some non-limiting embodiments, the intelligent industrial assistant (e.g., the dialogue manager thereof) may communicate a prompt requesting confirmation for the at least one command to the user based on the first dialogue template. Additionally or alternatively, the intelligent industrial assistant (e.g., the dialogue manager thereof) may receive a second natural language input from the user. Additionally or alternatively, the intelligent industrial assistant (e.g., the decision engine thereof, the dialogue manager thereof, and/or the like) may determine the user has confirmed the at least one command based on the second natural language input.

In some non-limiting embodiments, the package data may include at least one of a media item, a tabular list, a report template, a machine interface, a database interface, a combination thereof, and/or the like. In some non-limiting embodiments, the media item may include at least one of a user manual, a video recording, an audio recording, a combination thereof, and/or the like. In some non-limiting embodiments, the user manual may include a plurality of media markers. Additionally or alternatively, the first dialogue template may be associated with at least one media marker of the plurality of media markers. Additionally or alternatively, the command data may be associated with the at least one media marker of the plurality of media markers. Additionally or alternatively, communicating the command data may include transmitting, by the intelligent industrial assistant (e.g., the decision engine thereof), the command data to a user device to display the at least one media marker of the user manual.

In some non-limiting embodiments, the package data may include the tabular list. Additionally or alternatively, the first dialogue template may be associated with at least one field of the tabular list. Additionally or alternatively, the command data may be associated with the at least one field of the tabular list. Additionally or alternatively, communicating the command data may include transmitting, by the intelligent industrial assistant (e.g., the decision engine thereof), the command data to a user device to display the at least one field of the tabular list.

In some non-limiting embodiments, the package data may include a first industrial machine interface of a first industrial machine. Additionally or alternatively, the first industrial machine interface may include an application programming interface (API) associated with a dynamic load library (DLL) of the first machine.

In some non-limiting embodiments, the package data may include a first report template. Additionally or alternatively, the first report template may include at least one of a history field, a filtering field, a statistics field, a calculation field, a warning field, an alarm field, a machine status field, a combination thereof, and/or the like.

Further embodiments or aspects are set forth in the following numbered clauses:

Clause 1: A method for using an intelligent industrial assistant, comprising: receiving, by an intelligent industrial assistant, package data comprising at least one dialogue template; receiving, by an intelligent industrial assistant, a natural language input from a user; mapping, by the intelligent industrial assistant, at least a portion of the natural language input to a first dialogue template of the at least one dialogue template; determining, by the intelligent industrial assistant, at least one command based on the first dialogue template; and communicating, by the intelligent industrial assistant, command data associated with the at least one command.

Clause 2: The method of clause 1, further comprising receiving, by the intelligent industrial assistant, response data in response to the command data; and communicating, by the intelligent industrial assistant, a response to the user based on the response data.

Clause 3: The method of any preceding clause, further comprising displaying, by a user device, a dialogue window, the dialogue window comprising text of the natural language input and text of the response.

Clause 4: The method of any preceding clause, wherein the package data further comprises at least one industrial machine interface including a first industrial machine interface for a first industrial machine, wherein the first dialogue template is associated with at least one executable industrial machine operation, wherein the command data is associated with the at least one executable industrial machine operation, and wherein communicating the command data comprises transmitting, by the intelligent industrial assistant, the command data via the first industrial machine interface to the first industrial machine.

Clause 5: The method of any preceding clause, wherein the package data further comprises at least one database interface including a first database interface for a first database, wherein the first dialogue template is associated with retrievable data, wherein the command data is associated with the retrievable data, and wherein communicating the command data comprises transmitting, by the intelligent industrial assistant, the command data via the first database interface to the first database.

Clause 6: The method of any preceding clause, wherein the at least one dialogue template comprises a plurality of dialogue templates, the method further comprising selecting, by the intelligent industrial assistant, the first dialogue template from the plurality of dialogue templates based on the first natural language input.

Clause 7: The method of any preceding clause, further comprising determining, by the intelligent industrial assistant, the natural language input is insufficient to map to a portion of the first dialogue template; communicating, by the intelligent industrial assistant, a prompt requesting additional input to the user; receiving, by the intelligent industrial assistant, a second natural language input form the user; mapping, by the intelligent industrial assistant, at least a portion of the second natural language input to the portion of the first dialogue template.

Clause 8: The method of any preceding clause, further comprising communicating, by the intelligent industrial assistant, a prompt requesting confirmation for the at least one command to the user based on the first dialogue template; receiving, by the intelligent industrial assistant, a second natural language input from the user; and determining, by the intelligent industrial assistant, the user has confirmed the at least one command based on the second natural language input.

Clause 9: The method of any preceding clause, wherein the package data further comprises at least one of a media item, a tabular list, a report template, a machine interface, a database interface, or a combination thereof.

Clause 10: The method of any preceding clause, wherein the media item comprises at least one of a user manual, a video recording, an audio recording, or a combination thereof.

Clause 11: The method of any preceding clause, wherein the user manual comprises a plurality of media markers, wherein the first dialogue template is associated with at least one media marker of the plurality of media markers, wherein the command data is associated with the at least one media marker of the plurality of media markers, and wherein communicating the command data comprises transmitting, by the intelligent industrial assistant, the command data to a user device to display the at least one media marker of the user manual.

Clause 12: The method of any preceding clause, wherein the package data comprises the tabular list, wherein the first dialogue template is associated with at least one field of the tabular list, wherein the command data is associated with the at least one field of the tabular list, and wherein communicating the command data comprises transmitting, by the intelligent industrial assistant, the command data to a user device to display the at least one field of the tabular list.

Clause 13: The method of any preceding clause, wherein the package data comprises a first industrial machine interface of a first industrial machine, wherein the first industrial machine interface comprises an application programming interface (API) associated with a dynamic load library (DLL) of the first machine.

Clause 14: The method of any preceding clause, wherein the package data comprises a first report template, and wherein the first report template comprises at least one of a history field, a filtering field, a statistics field, a calculation field, a warning field, an alarm field, a machine status field, or a combination thereof.

Clause 15: A system for using an intelligent industrial assistant, comprising at least one processor; and at least one non-transitory computer readable medium comprising instructions to direct the at least one processor to receive, via a decision engine of an intelligent industrial assistant, package data comprising at least one dialogue template; receive, via a dialogue manager of the intelligent industrial assistant, a natural language input from a user; map, by the decision engine of the intelligent industrial assistant, at least a portion of the natural language input to a first dialogue template of the at least one dialogue template; determine, by the decision engine of the intelligent industrial assistant, at least one command based on the first dialogue template; and communicate, by the decision engine of the intelligent industrial assistant, command data associated with the at least one command.

Clause 16: The system of clause 15, wherein the instructions further direct the at least one processor to receive, by the intelligent industrial assistant, response data in response to the command data; and communicating, by the intelligent industrial assistant, a response to the user based on the response data.

Clause 17: The system of clause 15 or 16, further comprising a user device, wherein the user device is configured to display a dialogue window, the dialogue window comprising text of the natural language input and text of the response.

Clause 18: The system of any one of clauses 15-17, wherein the package data further comprises at least one industrial machine interface including a first industrial machine interface for a first industrial machine, wherein the first dialogue template is associated with at least one executable industrial machine operation, wherein the command data is associated with the at least one executable industrial machine operation, and wherein communicating the command data comprises transmitting, by the intelligent industrial assistant, the command data via the first industrial machine interface to the first industrial machine.

Clause 19: The system of any one of clauses 15-18, wherein the package data further comprises at least one database interface including a first database interface for a first database, wherein the first dialogue template is associated with retrievable data, wherein the command data is associated with the retrievable data, and wherein communicating the command data comprises transmitting, by the intelligent industrial assistant, the command data via the first database interface to the first database.

Clause 20: The system of any one of clauses 15-19, wherein the at least one dialogue template comprises a plurality of dialogue templates, and wherein the instructions further direct the at least one processor to select, by the intelligent industrial assistant, the first dialogue template from the plurality of dialogue templates based on the first natural language input.

Clause 21: The system of any one of clauses 15-20, wherein the instructions further direct the at least one processor to determine, by the intelligent industrial assistant, the natural language input is insufficient to map to a portion of the first dialogue template; communicate, by the intelligent industrial assistant, a prompt requesting additional input to the user; receive, by the intelligent industrial assistant, a second natural language input form the user; and map, by the intelligent industrial assistant, at least a portion of the second natural language input to the portion of the first dialogue template.

Clause 22: The system of any one of clauses 15-21, wherein the instructions further direct the at least one processor to communicate, by the intelligent industrial assistant, a prompt requesting confirmation for the at least one command to the user based on the first dialogue template; receive, by the intelligent industrial assistant, a second natural language input from the user; and determine, by the intelligent industrial assistant, the user has confirmed the at least one command based on the second natural language input.

Clause 23: The system of any one of clauses 15-22, wherein the package data further comprises at least one of a media item, a tabular list, a report template, a machine interface, a database interface, or a combination thereof.

Clause 24: The system of any one of clauses 15-23, wherein the media item comprises at least one of a user manual, a video recording, an audio recording, or a combination thereof.

Clause 25: The system of any one of clauses 15-24, wherein the user manual comprises a plurality of media markers, wherein the first dialogue template is associated with at least one media marker of the plurality of media markers, wherein the command data is associated with the at least one media marker of the plurality of media markers, and wherein communicating the command data comprises transmitting, by the intelligent industrial assistant, the command data to a user device to display the at least one media marker of the user manual.

Clause 26: The system of any one of clauses 15-25, wherein the package data comprises the tabular list, wherein the first dialogue template is associated with at least one field of the tabular list, wherein the command data is associated with the at least one field of the tabular list, and wherein communicating the command data comprises transmitting, by the intelligent industrial assistant, the command data to a user device to display the at least one field of the tabular list.

Clause 27: The system of any one of clauses 15-26, wherein the package data comprises a first industrial machine interface of a first industrial machine, wherein the first industrial machine interface comprises an application programming interface (API) associated with a dynamic load library (DLL) of the first machine.

Clause 28: The system of any one of clauses 15-27, wherein the package data comprises a first report template, and wherein the first report template comprises at least one of a history field, a filtering field, a statistics field, a calculation field, a warning field, an alarm field, a machine status field, or a combination thereof.

Clause 29: A computer program product for using an intelligent industrial assistant, the computer program product comprising at least one non-transitory computer-readable medium including one or more instructions that, when executed by at least one processor, cause the at least one processor to: receive, via a decision engine of an intelligent industrial assistant, package data comprising at least one dialogue template; receive, via a dialogue manager of the intelligent industrial assistant, a natural language input from a user; map, by the decision engine of the intelligent industrial assistant, at least a portion of the natural language input to a first dialogue template of the at least one dialogue template; determine, by the decision engine of the intelligent industrial assistant, at least one command based on the first dialogue template; and communicate, by the decision engine of the intelligent industrial assistant, command data associated with the at least one command.

Clause 30: The computer program product of clause 29, wherein the instructions further direct the at least one processor to receive, by the intelligent industrial assistant, response data in response to the command data; and communicating, by the intelligent industrial assistant, a response to the user based on the response data.

Clause 31: The computer program product of clause 29 or 30, further comprising a user device, wherein the user device is configured to display a dialogue window, the dialogue window comprising text of the natural language input and text of the response.

Clause 32: The computer program product of any one of clauses 29-31, wherein the package data further comprises at least one industrial machine interface including a first industrial machine interface for a first industrial machine, wherein the first dialogue template is associated with at least one executable industrial machine operation, wherein the command data is associated with the at least one executable industrial machine operation, and wherein communicating the command data comprises transmitting, by the intelligent industrial assistant, the command data via the first industrial machine interface to the first industrial machine.

Clause 33: The computer program product of any one of clauses 29-32, wherein the package data further comprises at least one database interface including a first database interface for a first database, wherein the first dialogue template is associated with retrievable data, wherein the command data is associated with the retrievable data, and wherein communicating the command data comprises transmitting, by the intelligent industrial assistant, the command data via the first database interface to the first database.

Clause 34: The computer program product of any one of clauses 29-33, wherein the at least one dialogue template comprises a plurality of dialogue templates, and wherein the instructions further direct the at least one processor to select, by the intelligent industrial assistant, the first dialogue template from the plurality of dialogue templates based on the first natural language input.

Clause 35: The computer program product of any one of clauses 29-34, wherein the instructions further direct the at least one processor to determine, by the intelligent industrial assistant, the natural language input is insufficient to map to a portion of the first dialogue template; communicate, by the intelligent industrial assistant, a prompt requesting additional input to the user; receive, by the intelligent industrial assistant, a second natural language input form the user; and map, by the intelligent industrial assistant, at least a portion of the second natural language input to the portion of the first dialogue template.

Clause 36: The computer program product of any one of clauses 29-35, wherein the instructions further direct the at least one processor to communicate, by the intelligent industrial assistant, a prompt requesting confirmation for the at least one command to the user based on the first dialogue template; receive, by the intelligent industrial assistant, a second natural language input from the user; and determine, by the intelligent industrial assistant, the user has confirmed the at least one command based on the second natural language input.

Clause 37: The computer program product of any one of clauses 29-36, wherein the package data further comprises at least one of a media item, a tabular list, a report template, a machine interface, a database interface, or a combination thereof.

Clause 38: The computer program product of any one of clauses 29-37, wherein the media item comprises at least one of a user manual, a video recording, an audio recording, or a combination thereof.

Clause 39: The computer program product of any one of clauses 29-38, wherein the user manual comprises a plurality of media markers, wherein the first dialogue template is associated with at least one media marker of the plurality of media markers, wherein the command data is associated with the at least one media marker of the plurality of media markers, and wherein communicating the command data comprises transmitting, by the intelligent industrial assistant, the command data to a user device to display the at least one media marker of the user manual.

Clause 40: The computer program product of any one of clauses 29-39, wherein the package data comprises the tabular list, wherein the first dialogue template is associated with at least one field of the tabular list, wherein the command data is associated with the at least one field of the tabular list, and wherein communicating the command data comprises transmitting, by the intelligent industrial assistant, the command data to a user device to display the at least one field of the tabular list.

Clause 41: The computer program product of any one of clauses 29-40, wherein the package data comprises a first industrial machine interface of a first industrial machine, wherein the first industrial machine interface comprises an application programming interface (API) associated with a dynamic load library (DLL) of the first machine.

Clause 42: The computer program product of any one of clauses 29-41, wherein the package data comprises a first report template, and wherein the first report template comprises at least one of a history field, a filtering field, a statistics field, a calculation field, a warning field, an alarm field, a machine status field, or a combination thereof.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, as well as the attached Appendix, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1A:
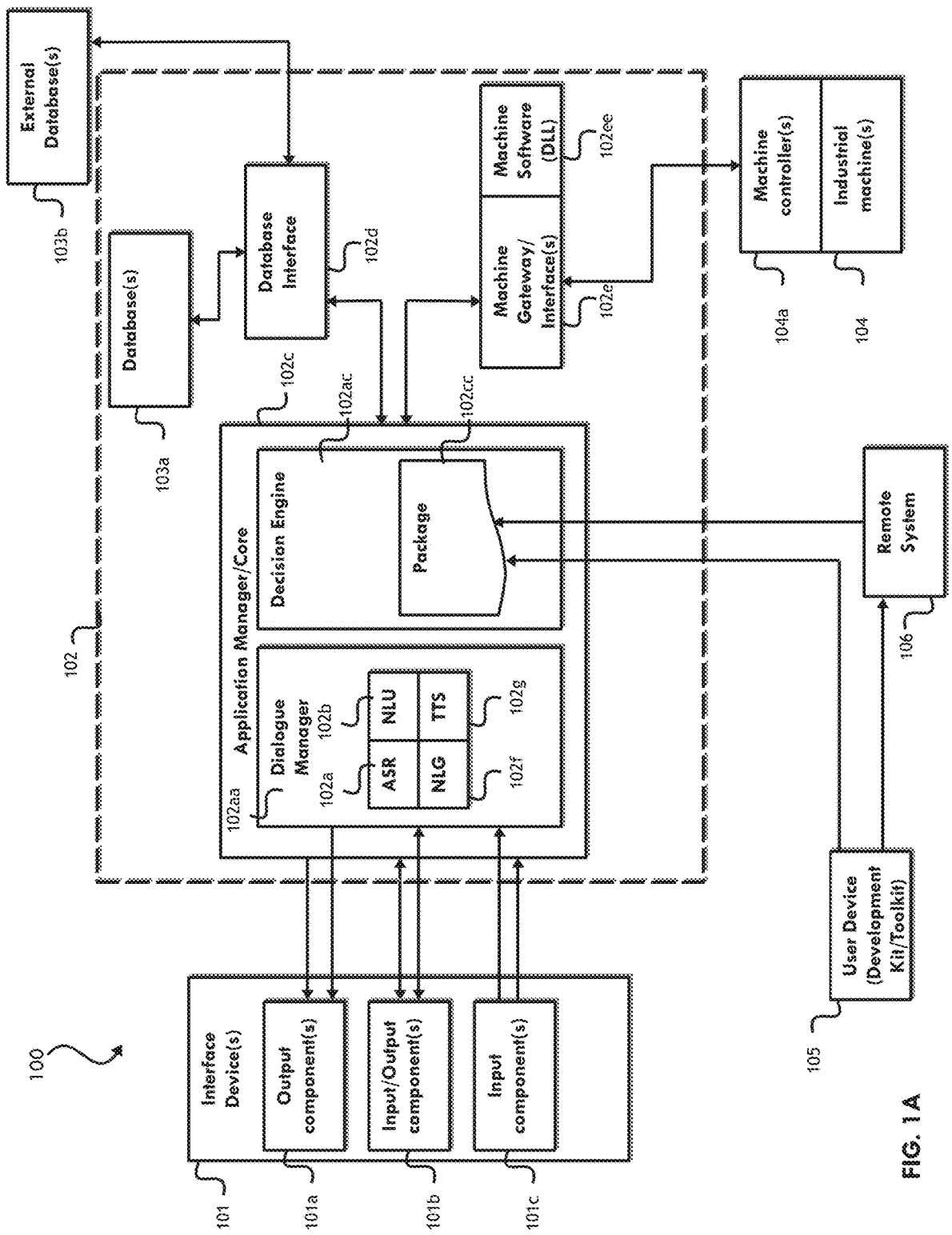
FIGS. 1A-1E are diagrams of non-limiting embodiments of an environment in which methods, systems, and/or computer program products, described herein, may be implemented according to the principles of the presently disclosed subject matter.
Figure 1B:
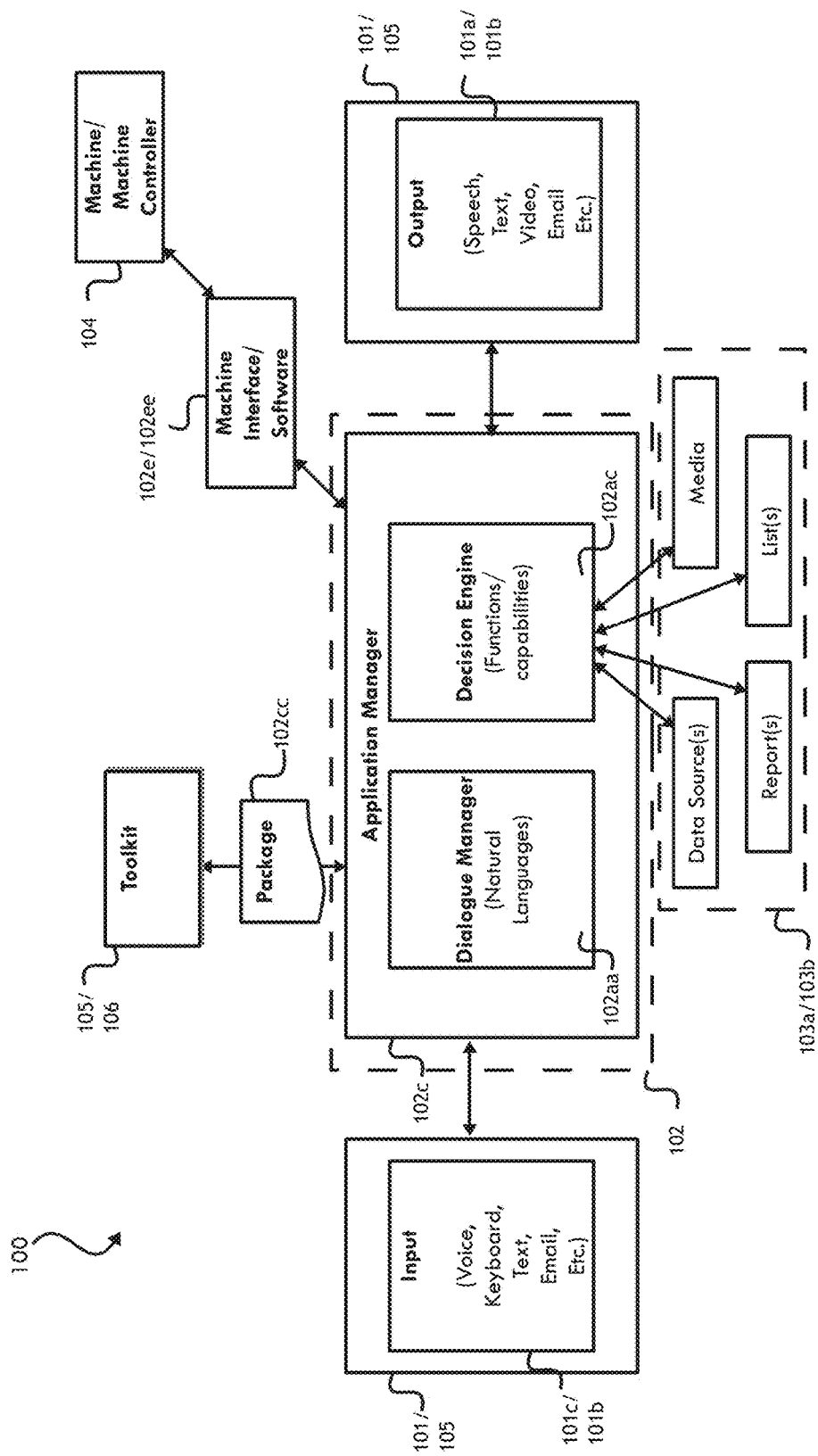
Figure 1C:
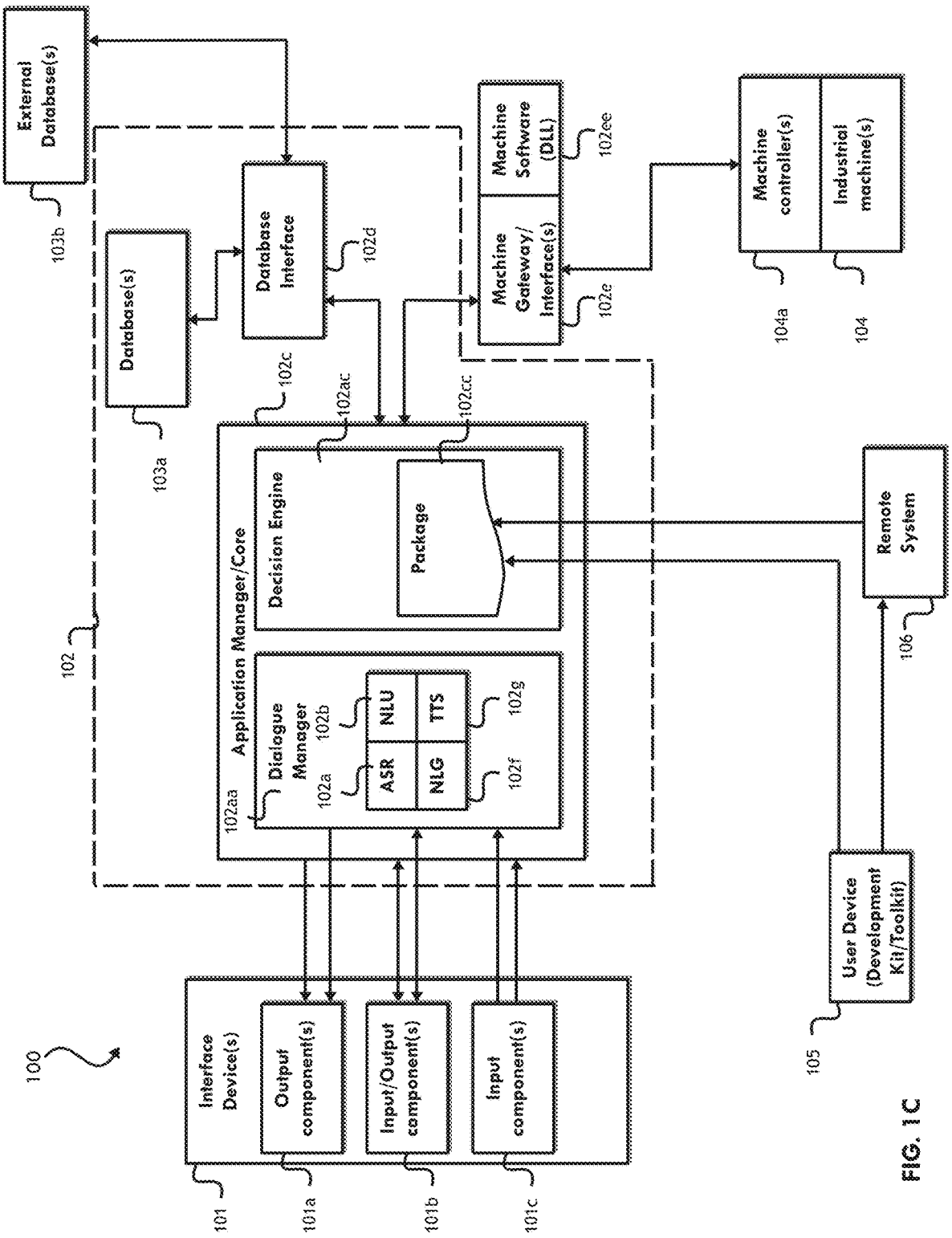
Figure 1D:
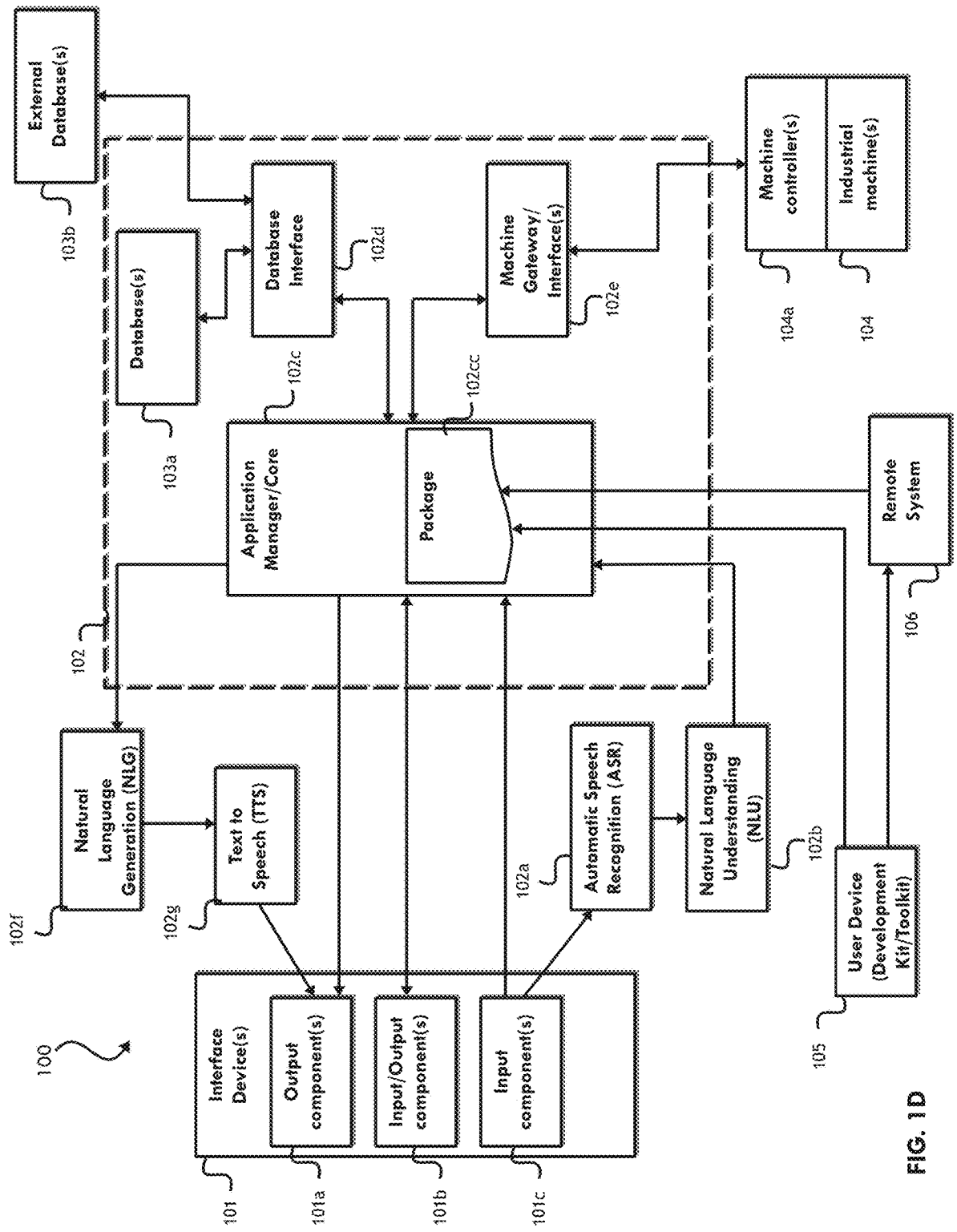
Figure 1E:
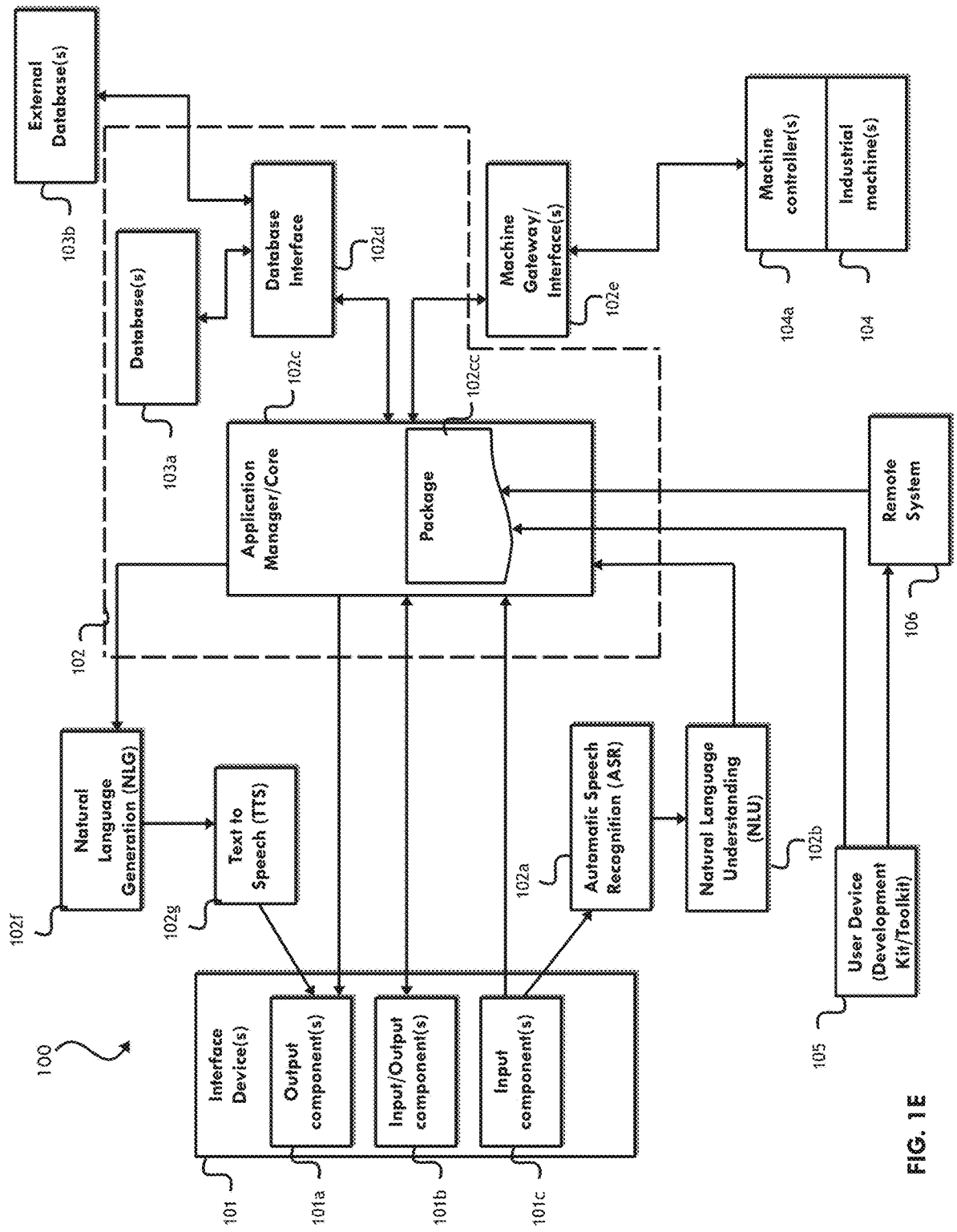

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

The terms "digital assistant," "virtual assistant," "intelligent automated assistant," or "automatic digital assistant" may refer to any information processing system that interprets natural language input in spoken and/or textual form to infer user intent, and performs actions based on the inferred user intent. The term "intelligent industrial assistant" may refer to an information processing system that is specifically designed, constructed, and/or implemented to interpret natural language input and/or inputs from industrial machines (e.g., manufacturing machines and/or the like), databases related thereto, and/or the like and perform actions based on the inferred intent in the context of or in relation to such industrial machines. For example, to act on an inferred intent, the intelligent industrial assistant may perform one or more of the following: identifying a task flow in the context of or in relation to at least one industrial machine with steps and parameters designed to accomplish the inferred intent; inputting specific requirements from the inferred intent into the task flow; executing the task flow by invoking programs, methods, services, APIs, or the like, e.g., to report, control, coach, calculate, plan, maintain, repair, teach, anticipate, record and/or the like in the context of or in relation to at least one industrial machine; and generating output responses to the user in an appropriate medium and/or mode, e.g., audible (e.g., speech, tone, and/or the like), text (e.g., text message, email, document, HTML, and/or the like), other visual form (e.g., graphic, video, and/or the like), any combination thereof, and/or the like.

Non-limiting embodiments or aspects of the disclosed subject matter are directed to methods, systems, and computer program products for an intelligent industrial assistant. For example, non-limiting embodiments of the disclosed subject matter provide using an intelligent industrial assistant based on mapping natural language input to at least one dialogue template included in package data to determine and communicate command data based thereon. Such embodiments provide techniques and systems that enable a user (e.g., operator of an industrial machine and/or the like) to use natural language inputs (e.g., spoken requests and/or the like), which may reduce and/or eliminate training to use individual machines (e.g., industrial machines). Additionally or alternatively, such embodiments provide techniques and systems that reduce and/or eliminate manual efforts (e.g., navigating through menus, multiple key strokes, clicks, and/or the like), time, and/or the like of such a user controlling a machine (e.g., industrial machine and/or the like). Additionally or alternatively, such embodiments provide techniques and systems that allow such a user to concurrently (e.g., simultaneously, contemporaneously, and/or the like) control, monitor, and/or the like multiple machines through a single intelligent industrial assistant. Additionally or alternatively, such embodiments provide techniques and systems that enable a user (e.g., operator of an industrial machine and/or the like) to control, monitor, and/or the like a machine without using the user's hands (e.g., when a user's hands are occupied, such as when carrying an object, writing notes, assisting another individual on the factory floor, and/or the like). Additionally or alternatively, such embodiments provide techniques and systems that enable such a user to receive indications of status or other information in various formats including non-visual formats (e.g., audible and/or the like), thereby reducing and/or eliminating a need for such a user to be physically near and/or looking at a machine while operating such a machine.

Additionally or alternatively, non-limiting embodiments or aspects of the disclosed subject matter provide techniques and systems for interoperability, e.g., determining which medium and/or mode of communication (e.g., audible, text, HTML, visual, any combination thereof, and/or the like) to use for output to a user from the intelligent industrial assistant. In some non-limiting embodiments or aspects, such determination may be based on ethnographic relationship(s), ethnographic mapping(s), and/or the like, which may be specific to users (e.g., operators) of industrial machines and/or related thereto. Additionally or alternatively, non-limiting embodiments of the disclosed subject matter provide techniques and systems for universality, e.g., allowing a single user (e.g., machine operator and/or the like) to operate many different devices (e.g., industrial machines, databases related thereto, and/or the like) through a single interface of the intelligent industrial assistant. For the purpose of illustration, a person knowledgeable regarding a type of industrial machine (e.g., machine tool, additive manufacturing device, subtractive manufacturing device, electrical discharge machining (EDM) device, milling device, cutting device grinding device, drilling device, micromachining device, part-producing device, and/or the like) may be able to operate many different devices of that type from different manufacturers/sources without a need to learn a separate interface/control system for each such machine. Additionally or alternatively, non-limiting embodiments or aspects of the disclosed subject matter provide techniques and systems for enablement of a user (e.g., operator, worker, and/or the like), e.g., in understanding and operating industrial machines, databases related thereto, and/or the like through the intelligent industrial assistant. For the purpose of illustration, the intelligent industrial assistant may enable a user (e.g., operator, worker, and/or the like) with respect to the industrial machine, databases related thereto, and/or the like, e.g., to understand, be prompted to, or be coached/taught how to control various types of machines; understand or be prompted about upcoming steps, processes, and/or the like; understand or be prompted about what is needed (e.g., parameters, requirements, materials, tools, and/or the like); understand or be informed of relevant information in a database (e.g., without being familiar with the particular database or how to perform searches, queries, and/or the like thereof); and/or the like.

For the purpose of illustration, in the following description, while the presently disclosed subject matter is described with respect to methods, systems, and computer program products for an intelligent industrial assistant, one skilled in the art will recognize that the disclosed subject matter is not limited to the illustrative embodiments. For example, the methods, systems, and computer program products described herein may be used with a wide variety of settings, such as any setting suitable for an intelligent assistant.

Referring now to FIGS. 1A-1E, FIGS. 1A-1E are diagrams of non-limiting embodiments of environment 100 in which systems, products, and/or methods, as described herein, may be implemented. As shown in FIGS. 1A-1E, environment 100 may include interface device 101, intelligent industrial assistant 102, database 103a, external database 103b, industrial machine 104, user device 105, and/or remote system 106.

Interface device 101 may include one or more devices capable of receiving information from and/or communicating information to intelligent industrial assistant 102 (e.g., via direct connection, wired and/or wireless network, and/or any other suitable communication technique). Additionally or alternatively, each interface device 101 may include a device capable of receiving information from and/or communicating information to other interface devices 101 (e.g., via wired or wireless network and/or any other suitable communication technique), user device(s) 105, and/or remote system 106. In some non-limiting embodiments, interface device 101 may include one or more input components 101c, one or more output components 101a, one or more input/output component 101b (e.g., a component that performs as both an input component and an output component, such as a touchscreen display, a headset with microphone and speaker/headphone, and/or the like), and/or one or more communication interfaces, as described herein. In some non-limiting embodiments, interface device 101 may or may not be capable of receiving information (e.g., from intelligent industrial assistant 102 and/or from another interface device 101) via a short-range wireless communication connection (e.g., an NFC communication connection, an RFID communication connection, a Bluetooth® communication connection, a Zigbee® communication connection, and/or the like), and/or communicating information (e.g., to intelligent industrial assistant 102, another interface device 101, user device 105, remote system 106, and/or the like) via a short-range wireless communication connection. In some non-limiting embodiments, interface device 101 may include input component 101c (e.g., a microphone), an output component 101a (e.g., a speaker, headphone, and/or the like), an input/output component 101b (e.g., a touchscreen, a headset, and/or the like), and/or the like. In some non-limiting embodiments, interface device 101 may include multiple devices. For example, interface device 101 may include a headset including output component 101a (e.g., a speaker, such as headphones) and/or input component 101c (e.g., a microphone). Additionally or alternatively, interface device 101 may include a portable and/or handheld device (e.g., a computer, a laptop, a personal digital assistant (PDA), a smartphone, a tablet, and/or the like) with input and/or output components (e.g., input/output component 101b, such as a touchscreen; input components 101c such as a keyboard, a mouse, and/or the like; output components 101a such as a speaker and/or the like; and/or the like).

Intelligent industrial assistant 102 may include one or more devices capable of receiving information from and/or communicating information to interface device 101, database 103a, external database 103b, industrial machine 104, user device 105, and/or remote system 106. In some non-limiting embodiments, intelligent industrial assistant 102 may be integrated with (e.g., completely, partially, and/or the like) and/or directly connected to interface device 101. In some non-limiting embodiments, intelligent industrial assistant 102 may include a computing device, such as a portable and/or handheld device (e.g., a computer, a laptop, a personal digital assistant (PDA), a smartphone, a tablet, and/or the like), a desktop computer, a server, a group of servers, and/or other like devices. In some non-limiting embodiments, intelligent industrial assistant 102 may be associated with a service provider, e.g., a third party separate from the user of the interface device 101, the maintainer of the database 103a, the maintainer of the external database 103b, the operator/owner/provider/manufacturer of the industrial machine 104, the provider of remote system 106, and/or the user of user device 105. In some non-limiting embodiments, intelligent industrial assistant 102 may be in communication with a data storage device, which may be local or remote to intelligent industrial assistant 102. In some non-limiting embodiments, intelligent industrial assistant 102 may be capable of receiving information from, storing information in, communicating information to, or searching information stored in the data storage device.

In some non-limiting embodiments, intelligent industrial assistant 102 may have various hardware and/or software modules and/or may store information and/or software related to the operation and use of intelligent industrial assistant 102. For example, intelligent industrial assistant may 102 may include dialogue manager 102aa, decision engine 102ac, automatic speech recognition (ASR)/speech to text (STT) module 102a, natural language understanding (NLU) module 102b, application manager 102c, database-assistant interface 102d, machine gateway 102e, natural language generator (NLG) module 102f, text to speech (TTS) module 102g, and/or the like. Additionally or alternatively, database interface 102d may include a hardware and/or a software interface (e.g., an application-programming interface and/or the like) to enable communication between intelligent industrial assistant 102, database 103a, and/or external database 103b. In some non-limiting embodiments, application manager 102c may include at least one of dialogue manager 102aa, decision engine 102ac, any combination thereof and/or the like. Additionally or alternatively, dialogue manager 102aa may include at least one of ASR/STT module 102a, NLU module 102b, NLG module 102f, TTS module 102g, other speech processing, and/or the like. In some non-limiting embodiments, ASR/STT module 102a, NLU module 102b, other speech to text processing, and/or the like may be a single module (e.g., STT module 102a). Additionally or alternatively, NLG module 102f, TTS module 102g, other text to speech processing, and/or the like may be a single module (e.g., TTS module 102g). In some non-limiting embodiments, ASR/STT module 102a, NLU module 102b, other speech to text processing, NLG module 102f, TTS module 102g, other text to speech processing, and/or the like may be a single module (e.g., dialogue manager 102aa). In some non-limiting embodiments, at least one of ASR/STT module 102*a*, NLU module 102*b*, NLG module 102*f*, TTS module 102*g*, dialogue manager 102*aa*, a combination thereof, and/or the like may be separate from and/or in communication with intelligent industrial assistant 102. In some non-limiting embodiments, intelligent industrial assistant 102 and/or machine gateway 102*e* may include at least one machine interface, e.g., a hardware and/or a software interface (e.g., an application-programming interface, dynamic load library, and/or the like) to enable communication between the intelligent industrial assistant 102 (e.g., application manager 102*c*) and industrial machine 104 (e.g., machine controller 104*a* of industrial machine 104). Additionally or alternatively, in some non-limiting embodiments, intelligent industrial assistant 102, machine gateway 102*e*, and/or industrial machine 104 (e.g., machine controller 104*a* of industrial machine 104) may include machine-specific software 102*ee* (e.g., a dynamic load library (DLL)) to enable communication between the intelligent industrial assistant 102 (e.g., application manager 102*c*) and industrial machine 104 (e.g., machine controller 104*a* of industrial machine 104). For example, machine-specific software 102*ee* (e.g., DLL) may include a library of at least one of functions, commands, variables, fields, inputs, outputs, any combination thereof, and/or the like of industrial machine 104 (e.g., machine controller 104*a* of industrial machine 104) that are accessible, usable, and/or the like by intelligent industrial assistant 102 (e.g., application manager 102*c*). In some non-limiting embodiments, machine gateway 102*e* may be separate from and/or in communication with intelligent industrial assistant 102. For example, machine gateway may be implemented (e.g., completely, partially, and/or the like) with industrial machine 104 (e.g., machine controller 104*a* of industrial machine 104). In some non-limiting embodiments, intelligent industrial assistant 102 may include at least one output interface (e.g., an audio card, a video card, a renderer, a coder, a decoder, a coder-decoder (codec) a communication interface, and/or the like) to enable communication between the intelligent industrial assistant 102 (e.g., application manager 102*c*) and at least one of output component(s) 102*a*, input/output component(s) 102*b*, and/or the like.

In some non-limiting embodiments, application manager 102*c* may be an industrial process application manager. Additionally or alternatively, application manager 102*c* may include decision ending 102*ac*. In some non-limiting embodiments, application manager 102*c* (e.g., decision engine 102*ac* thereof and/or the like) may include, receive, and/or be configured with package 102*cc*. In some non-limiting embodiments, package 102*cc* may include at least one module (e.g., software module, firmware module, and/or the like) and/or package data that may include at least one of dialogue templates, machine/group identification data, features, sequences, actions, functions, commands, variables, fields, inputs, outputs, parameters, classes, interfaces (e.g., machine interface(s) of machine gateway 102*e*, database interface 102*d*, output interface 102*h*, and/or the like), any combination thereof, and/or the like of the intelligent industrial assistant 102 (e.g., application manager 102*c*, decision engine 102*ac* thereof, and/or the like). In some non-limiting embodiments, application manager 102*c* (e.g., decision engine 102*ac* thereof and/or the like) and/or package 102*cc* may include and/or be configured to determine ethnographic relationships, e.g., mapping(s) and/or cross-correlations between functions performable by intelligent industrial assistant 102 (e.g., report, control, coach, calculate, plan, maintain, repair, teach, anticipate, record and/or the like) and sequences/task groups (e.g., task flows of users specific to the role of such user, such as machine operator, and/or the like). Additionally or alternatively, application manager 102*c* (e.g., decision engine 102*ac* thereof and/or the like) and/or package 102*cc* may include and/or be configured to determine mappings to industrial machine(s) 104 and/or databases (e.g., database(s) 103*a* and/or external database(s) 103*b*), which may be based (e.g., completely, partially, and/or the like) on one or more predetermined ethnographic relationship(s).

In some non-limiting embodiments, application manager 102*c* (e.g., dialog manager 102*aa* thereof, decision engine 102*ac* thereof, and/or the like) and/or package 102*cc* may include and/or be configured to implement interoperability, e.g., determining which medium and/or mode of communication (e.g., audible, text, HTML, visual, tactile, any combination thereof, and/or the like) to use for input from or output to a user from intelligent industrial assistant 102. In some non-limiting embodiments, such determination may be based on one or more predetermined ethnographic relationship(s), dialogue template(s), and/or the like. Additionally or alternatively, such a determination may be based on selecting a medium and/or mode of communication that reduces (e.g., minimizes and/or the like) a number of steps (e.g., successive iterations of inputs and/or outputs) by the user using the intelligent industrial assistant 102. Additionally or alternatively, such a determination may be based on providing a way to accomplish a task (e.g., at least one action and/or the like) that increases efficiency, effectiveness, and/or the like. Additionally or alternatively, such a determination may be based on selecting a medium and/or mode of communication to reduce (e.g., eliminate, decrease, and/or the like) inputs requiring a use of the user's hands (e.g., enable voice/speech input and/or voice/speech output to allow a user to operate a machine without the user's hands), thereby enabling the user to interact with intelligent industrial assistant 102 while the user's hands are occupied. In some non-limiting embodiments, if content (e.g., a response, a prompt, and/or the like) is short (e.g., concise, less than a threshold number of characters, less than a threshold number of words (e.g., 10 words), less than a threshold number of sentences, less than a threshold number of seconds of speech (e.g., 5 seconds), and/or the like), such content may be output by intelligent industrial assistant 102 audibly (e.g., spoken words), as text (e.g., in dialogue window on a display screen, as part of an HTML page, and/or the like), and/or the like. In some non-limiting embodiments, a user (e.g., machine operator and/or the like) may not be able to (e.g., be prevented from and/or the like) providing input (e.g., natural language input) until audible output (e.g., spoken words of a response) is completed, so content that is long (e.g., greater than the aforementioned thresholds and/or the like) may be undesirable, cause delays in time, and/or the like. In some non-limiting embodiments, when content includes the results of at least one calculation, such content may be out in a tabular format (e.g., a tabular list), a report template, and/or the like. Additionally or alternatively, such output (e.g. tabular list, report template, and/or the like) may be displayed in a separate window (e.g., on the display screen), communicated by a separate channel (e.g., email, text (e.g., SMS) message, multimedia (e.g., MMS) message, and/or the like). Additionally or alternatively, a user may optionally be able to select (e.g., touch on a touch screen, click with a pointer device such as a mouse, and/or the like) an item in such a list rather than or in addition to providing subsequent natural language input (e.g., voice/speech input, typed input, and/or the like), e.g., when the item may be cumbersome to speak or type (e.g., a word greater than a threshold length, a string of words greater than a threshold number of words, a number with multiple digits greater than a threshold number of digits, and/or the like). In some non-limiting embodiments, if content includes identification information (e.g., contact information, email addresses, phone numbers, and/or the like), such content may be displayed (e.g., in a dialogue window, in a separate window on the display screen, and/or the like). In some non-limiting embodiments, number values with multiple digits following a decimal point may be rounded to a selected (e.g., predetermined, selectable, and/or the like) number of digits after the decimal before being output (e.g., as audible speech, text in a dialogue window, text on an HTML page, and/or the like). In some non-limiting embodiments, when content includes at least one media item, such media item may be displayed in a separate window (e.g., on a display screen and/or the like). Additionally or alternatively, large media items (e.g., greater than a threshold number of pages (e.g., for documents), seconds (e.g., for audio, visual, or audiovisual files), and/or the like) may be divided (e.g., segmented and/or the like) into smaller media items, which may reduce load times. Additionally or alternatively, such smaller media items may be displayed serially, concurrently, and/or the like. In some non-limiting embodiments, when content includes warnings (e.g., alarms, alerts, and/or the like), such content may include at least one of audible output (e.g., spoken words, loud and/or repetitive noises, tones, and/or the like), visual output (e.g., display in the dialogue window, in a separate window, and/or the like), communication by at least one other channel (e.g., email, text (e.g., SMS) message, multimedia (e.g., MMS) message, and/or the like), any combination thereof, and/or the like. In some non-limiting embodiments, output (e.g., content, media items, warnings, and/or the like) may include tactile output (e.g., haptic, vibration, and/or the like output). In some non-limiting embodiments, output (e.g., content, media items, warnings, and/or the like) may include a combination of modes of communication, e.g., tactile and visual (e.g., via a touchscreen), visual and audible (e.g., display of information in a dialogue window with accompanying audible speech, audiovisual media content, and/or the like), and/or the like. In some non-limiting embodiments, intelligent industrial assistant 102 may include an image capture device (e.g., camera, barcode scanner, and/or the like as at least one of input component 101c, input/output component 101b, and/or the like), which may be used to input data (e.g., barcode, quick response (QR) code, alphanumeric information, optical character recognition, and/or the like), and/or intelligent industrial assistant 102 may display (e.g., via a display screen as output component 101a, input/output component 101b, and/or the like) such data (e.g., barcode, quick response (QR) code, alphanumeric information, and/or the like) as output. In some non-limiting embodiments, output may include indications of status or other information in various formats including non-visual formats (e.g., audible and/or the like), thereby reducing and/or eliminating a need for such a user to be physically near and/or looking at a machine while operating such a machine.

In some non-limiting embodiments, each dialogue template (e.g., of package 102cc and/or the like) may include at least one of function data, group data, feature data, sequence data, parameter data, expected dialogue data, action data, any combination thereof, and/or the like. For example, function data may be associated with (e.g., identify and/or the like) of at least one function (e.g., report, control, coach, calculate, plan, maintain, repair, teach, anticipate, record and/or the like) of intelligent industrial assistant 102 into which the dialogue template is categorized (e.g., classified and/or the like). Additionally or alternatively, group data may be associated with (e.g., identify and/or the like) a group of features (e.g., a group of features associated with an industrial machine 104, a database such as database 103a and/or external database 103b, and/or the like). For example, a group may include all features (e.g., functions, commands, variables, fields, inputs, outputs, any combination thereof, and/or the like) associated with a particular industrial machine 104. Additionally or alternatively, each industrial machine 104 (or make/model of industrial machines 104) may have at least one group associated therewith. In some non-limiting embodiments, the group data may include an alphanumeric string (e.g., a four digit number, a four character string, and/or the like). Additionally or alternatively, feature data may be associated with (e.g., identify and/or the like) a feature (e.g., a first feature) of the group of features. In some non-limiting embodiments, a feature may be associated with at least one operation for a user (e.g., machine operator and/or the like) to interact with intelligent industrial assistant 102. For example, a feature may include a direction, e.g., a request (e.g., command, question, and/or the like) for intelligent industrial assistant 102 to perform an action. Additionally or alternatively, a feature may include a confirmation, e.g., an input (e.g., spoken/verbal input, click, key stroke, and/or the like) to intelligent industrial assistant 102 confirming that intelligent industrial assistant 102 should perform an action (e.g., "yes," "no," "cancel," and/or the like). Additionally or alternatively, a feature may be a complex feature, e.g., a series of decision steps in which a user (e.g., machine operator and/or the like) provides multiple inputs (e.g., directions, confirmations, and/or the like) to intelligent industrial assistant 102 in at least one specified sequence. Additionally or alternatively, a feature may include a compound feature, e.g., a batch of actions, which may be performed in parallel, in series, any combination thereof, and/or the like. In some non-limiting embodiments, sequence data may be associated with (e.g., identify, include, and/or the like) a sequence of expected dialogue by the user (e.g., machine operator and/or the like), by intelligent industrial assistant 102, and/or the like. For example, sequence data may be associated with (e.g., identify, include, and/or the like) at least one item of expected dialogue data. Additionally or alternatively, expected dialogue data may be associated with (e.g., identify, include, and/or the like) at least one item of expected dialogue of the sequence. For example, each item of expected dialogue may include at least one of an expected natural language input from the user (e.g., machine operator), a response from intelligent industrial assistant 102 to the user, and/or the like. In some non-limiting embodiments, expected dialogue data may include a plurality of alternative items of expected dialogue associated with one dialogue template. For example, the plurality of alternative items of expected dialogue may include synonyms, alternative phrasings, and/or the like that express a same intent of the user to perform an activity (e.g., at least one action, task, and/or the like) associated with the same dialogue template (e.g., "Start warm up cycle," "Warm up the machine," and/or the like may be alternative items of expected dialogue to initiate a warm-up process for an industrial machine 104; "Run process 1234," "Start m-code 1234," and/or the like may be alternative items of expected dialogue to initiate a process associated with the stated code; "Report current tool," "Inform about current tool," and/or the like may be alternative items of expected dialogue to request information on a current tool; "Turn on the lights,"

"Lights on," and/or the like may be alternative items of expected dialogue to request turning on the lights; and/or the like). In some non-limiting embodiments, expected dialogue data may include initiating dialogue data associated with at least one natural language input (e.g., phrase and/or the like) for initiating the sequence associated with the expected dialogue data. In some non-limiting embodiments, parameter data may be associated with (e.g., identify, include, and/or the like) at least one parameter (e.g., value, category, word, and/or the like) associated with at least one item of expected dialogue. For example, parameter data may be associated with a part number, a part identification, a machine number (e.g., of a particular industrial machine 104, a model of industrial machine 104, and/or the like), a machine identifier, a number, a category (e.g., low, medium, high, slow, fast, on, off, and/or the like), a word (e.g., name of a part, a machine, a database, an item of media, and/or the like), an alphanumeric string, and/or the like. In some non-limiting embodiments, at least one item of parameter data may be associated with input from the user to intelligent industrial assistant 102. Additionally or alternatively, at least one item of parameter data may be associated with output (e.g., response and/or the like) from intelligent industrial assistant 102. In some non-limiting embodiments, action data may be associated with (e.g., identify and/or the like) at least one action performable by intelligent industrial assistant 102, at least one action performable by another device (e.g., industrial machine 104, database 103a, external database 103b, and/or the like) separate from intelligent industrial assistant 102 (which may be at least partially controlled by intelligent industrial assistant 102), and/or the like. In some non-limiting embodiments, a dialogue template (e.g., the action data thereof and/or the like) may be associated with (e.g., identify, include, and/or the like) at least one of a media item, a tabular list, a report template, a machine interface, a database interface, custom content (e.g., of a user, the user's organization, and/or the like, which may be output by any suitable mode or medium of communication as described herein, such as email, text, visual display, audible output, and/or the like), an item of software (e.g., an executable file, a process, a module, a routine, a sub-routine, a function, and/or the like), a search (e.g., for a document, a retrievable item of data, and/or the like), a combination thereof, and/or the like.

In some non-limiting embodiments, certain actions may have prerequisites. For example, at least one of sequence data, action data, and/or the like may include prerequisite data associated with (e.g., identifying, including, and/or the like) at least one prerequisite (e.g., prerequisite action, prerequisite event, prerequisite condition, and/or the like). For example, warming up a machine (such as industrial machine 104) may be a prerequisite action to performing certain operations with such a machine, and sequence data, action data, and/or the like associated with such operations may include prerequisite data identifying sequence data, action data, and/or the like associated with warming up the machine. For example, a lack of warnings (e.g., alarms, alerts, and/or the like) may be a prerequisite condition to performing certain operations with a machine (e.g., industrial machine 104), and sequence data, action data, and/or the like associated with such operations may include prerequisite data identifying sequence data, action data, and/or the like associated with such warnings. In some non-limiting embodiments, intelligent industrial assistant 102 may prevent performing an action if the prerequisite is not satisfied. Additionally or alternatively, intelligent industrial assistant 102 may provide a response indicating such action cannot be performed and/or identifying the prerequisite to the user. In some non-limiting embodiments, intelligent industrial assistant 102 may communicate a prompt to the user requesting additional input associated with the prerequisite, confirmation associated with the prerequisite, and/or the like. Additionally or alternatively, if the user does not provide a reply to the prompt (e.g., because the user does not know), intelligent industrial assistant 102 may recommend a reply (e.g., at least on item of expected dialogue in response to the prompt, which may be based on the dialogue template, the expected dialogue data thereof, and/or the like). In some non-limiting embodiments, the machine (e.g., industrial machine 104, machine interface 102e thereof, machine-specific software 102ee of industrial machine 104, and/or the like) may include code (e.g., software, firmware, protocols, executable instructions, parameters, and/or the like) to perform certain actions, and such code may include prerequisite data (e.g., dependencies and/or the like) identifying prerequisites of at least one some the actions.

In some non-limiting embodiments, at least one of (e.g., each of) ASR module 102a, NLU module 102b, NLG module 102f, TTS module 102g, application manager 102c (e.g., dialogue manager 102aa thereof, decision engine 102ac thereof, and/or the like), and/or package 102cc may include and/or be configured to implement a corpus of vocabulary (e.g., customized lexicon and/or the like). In some non-limiting embodiments, at least a portion of the corpus of vocabulary may be specific to the environment, e.g., in the context of or in relation to manufacturing generally; one or more specific types of manufacturing; industrial machines generally; one or more specific types of industrial machines; industrial processes generally; one or more specific industrial processes; databases related to manufacturing, industrial machines, and/or industrial processes; standard work and/or task flows related to manufacturing, industrial machines, and/or industrial processes; and/or the like. Additionally or alternatively, at least a portion of the corpus of vocabulary may be specific to one or more roles of individuals e.g., in the context of or in relation to manufacturing; industrial machines; industrial processes; databases related to manufacturing, industrial machines, and/or industrial processes; standard work and/or task flows related to manufacturing, industrial machines, and/or industrial processes; and/or the like. For example, such roles may include an operator (e.g., machine operator) of industrial machines in general, an operator of one or more specific types of industrial machines, a factory floor staff member, a supervisor, a manager (e.g., operations manager, production manager, and/or the like), an engineer (e.g., manufacturing engineer, field service engineer, and/or the like), a maintenance worker, a salesman, an inspector, an analyst, and/or the like. Additionally or alternatively, at least a portion of the corpus of vocabulary may be specific to technically-alike meanings, e.g., synonyms, metonyms, equivalents, associated words, substitutes, and/or the like. For example, at least some such technically-alike meanings may be based on predetermined ethnographic relationships.

Database 103a may include one or more devices capable of receiving information from and/or communicating information to intelligent industrial assistant 102. Additionally or alternatively, database 103a may include a data storage device, which may be local or remote to intelligent industrial assistant 102. In some non-limiting embodiments, database 103a may be integrated with (e.g., completely, partially, and/or the like) and/or directly connected to intelligent industrial assistant 102. Additionally or alternatively, database 103a may be implemented (e.g., completely, partially, and/or the like) separate from intelligent industrial assistant 102. For example, database 103a may be a separate device and/or system from intelligent industrial assistant 102. In some non-limiting embodiments, database 103a and intelligent industrial assistant 102 may be maintained by the same entity. In some non-limiting embodiments, database 103a may include a computing device, such as a server, a group of servers, and/or other like devices. In some non-limiting embodiments, database 103a may be capable of retrieving information from, storing information in, communicating information to, or searching information stored in the data storage device.

External database 103b may include one or more devices capable of receiving information from and/or communicating information to intelligent industrial assistant 102. Additionally or alternatively, external database 103b may include a data storage device, which may be local or remote to intelligent industrial assistant 102. In some non-limiting embodiments, external database 103b may be associated with a third party, e.g., separate from the user of interface device 101, intelligent industrial assistant 102, and/or the operator/owner/provider/manufacturer of the industrial machine 104. In some non-limiting embodiments, external database 103b and intelligent industrial assistant 102 may be maintained by the same entity (e.g., different groups within the same party). In some non-limiting embodiments, external database 103b may include a computing device, such as a server, a group of servers, and/or other like devices. In some non-limiting embodiments, external database 103b may be capable of retrieving information from, storing information in, communicating information to, or searching information stored in the data storage device.

Industrial machine 104 may include one or more devices capable of receiving information from and/or communicating information to intelligent industrial assistant 102. Additionally or alternatively, industrial machine 104 may include one or more devices capable of performing an industrial, manufacturing, machining, and/or physical task. For example, industrial machine 104 may include at least one of a machine tool, an additive manufacturing device, a subtractive manufacturing device, an electrical discharge machining (EDM) device, a milling device, a cutting device, a grinding device, a drilling device, a micromachining device, a part-producing device, and/or the like. In some non-limiting embodiments, industrial machine 104 may include machine controller 104a (e.g., separate from intelligent industrial assistant 102), which may be integrated with (e.g., completely, partially, and/or the like), local to, or remote from industrial machine 104. In some non-limiting embodiments, intelligent industrial assistant 102 may be integrated with (e.g., completely, partially, and/or the like) and/or directly connected to industrial machine 104 and/or machine controller 104a.

User device 105 may include one or more devices capable of receiving information from and/or communicating information to intelligent industrial assistant 102 and/or remote system 106 (e.g., via direct connection, wired and/or wireless network, and/or any other suitable communication technique). For example, user device 105 may include a computing device (e.g., a portable and/or handheld device (e.g., a computer, a laptop, a personal digital assistant (PDA), a smartphone, a tablet, and/or the like), a desktop computer, a server, a group of servers, and/or other like devices). In some non-limiting embodiments, user device 105 may include a development kit, toolkit, and/or the like for developing, modifying, generating, communicating, and/or receiving package data (e.g., dialogue templates and/or the like, as described herein), e.g., for package 102cc. In some non-limiting embodiments, user device 105 may communicate package data to remote system 106, intelligent industrial assistant 102, and/or the like. In some non-limiting embodiments, user device 105 may be integrated with and/or directly connected to interface device 101, intelligent industrial assistant 102, and/or remote system 106.

Remote system 106 may include one or more devices capable of receiving information from and/or communicating information to intelligent industrial assistant 102 and/or user device 105 (e.g., via direct connection, wired and/or wireless network, and/or any other suitable communication technique). For example, remote system 106 may include a computing device (e.g., a portable and/or handheld device (e.g., a computer, a laptop, a personal digital assistant (PDA), a smartphone, a tablet, and/or the like), a desktop computer, a server, a group of servers, and/or other like devices). In some non-limiting embodiments, remote system 106 may receive package data (e.g., dialogue templates and/or the like, as described herein) from user device 105 and/or communicate package data to user device 105. Additionally or alternatively, remote system 106 may communicate package data (e.g., package 102cc and/or the like, as described herein) to intelligent industrial assistant 102c and/or receive package data from intelligent industrial assistant 102c. In some non-limiting embodiments, remote system 106 may be integrated with and/or directly connected to user device 105.

In some non-limiting embodiments, intelligent industrial assistant 102 may be connected to interface device 101, database 103a, external database 103b, industrial machine 104, user device 105, remote system 106, and/or any combination thereof by one or more networks. The network(s) may include one or more wired and/or wireless networks. For example, the network(s) may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, a virtual private network (VPN), a local network, an ad hoc network, an intranet, the Internet, a fiber optic-based network, a cloud computing network, and/or the like, and/or a combination of these or other types of networks. In some non-limiting embodiments, intelligent industrial assistant 102 may capable of (e.g., configured to) communicating (e.g., sending, transmitting, receiving, and/or the like) messages (e.g., email, text (e.g., SMS) messages, multimedia (e.g., MMS) messages), and/or the like over such networks. Additionally or alternatively, intelligent industrial assistant 102 may be capable of (e.g., configured to) accessing media items (e.g., documents and/or the like) available through such networks.

The number and arrangement of systems, devices, and/or networks shown in FIGS. 1A-1E are provided as an example. There may be additional systems, devices, and/or networks; fewer systems, devices, and/or networks; different systems, devices, and/or networks; and/or differently arranged systems, devices, and/or networks than those shown in FIGS. 1A-1E. Furthermore, two or more systems or devices shown in FIGS. 1A-1E may be implemented within a single system or device, or a single system or device shown in FIGS. 1A-1E may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
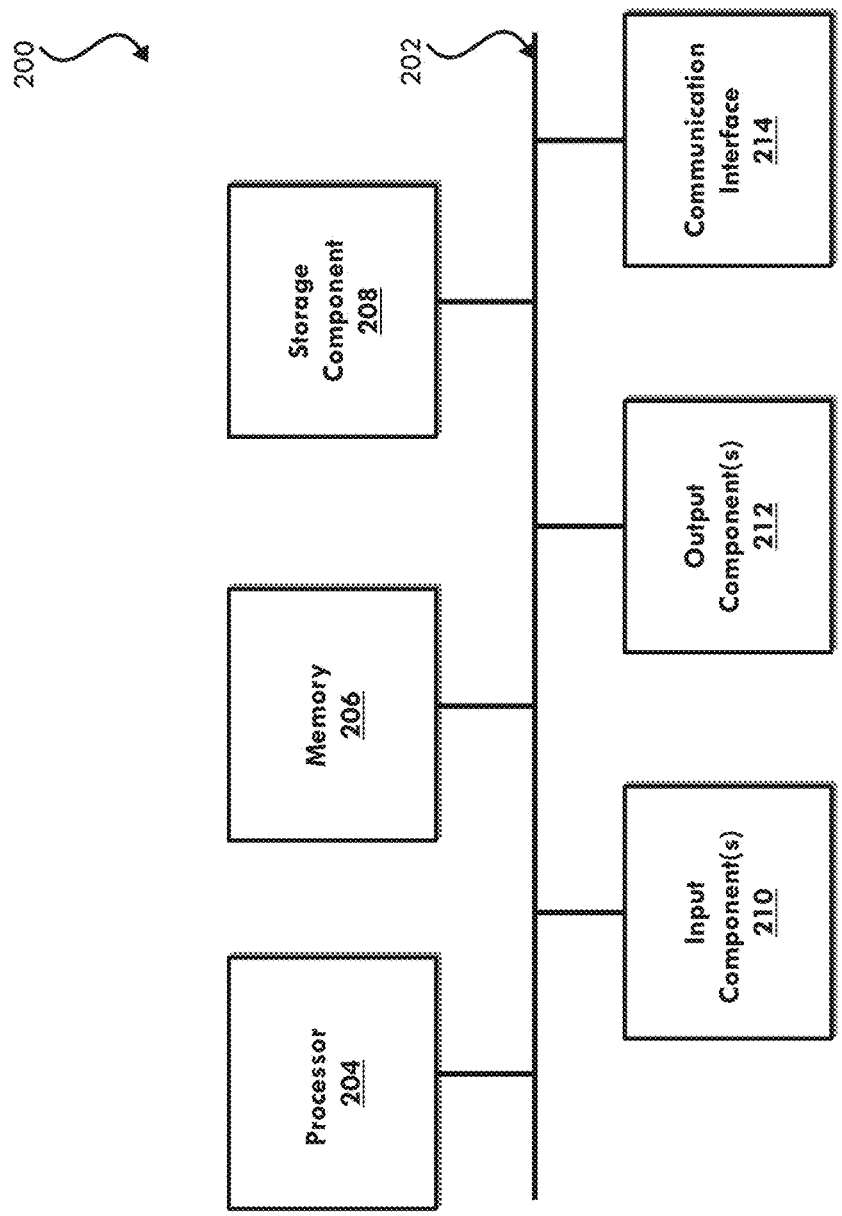
FIG. 2 is a diagram of a non-limiting embodiment of components of one or more devices of FIGS. 1A-1E.

Referring now to FIG. 2, FIG. 2 is a diagram of example components of a device 200. Device 200 may correspond to one or more devices of interface device 101, one or more devices of intelligent industrial assistant 102, one or more devices of database 103a, external database 103b, one or more devices of industrial machine 104, user device 105, and/or one or more devices of remote system 106. In some non-limiting embodiments, interface device 101, intelligent industrial assistant 102, database 103a, external database 103b, industrial machine 104, user device 105, and/or remote system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
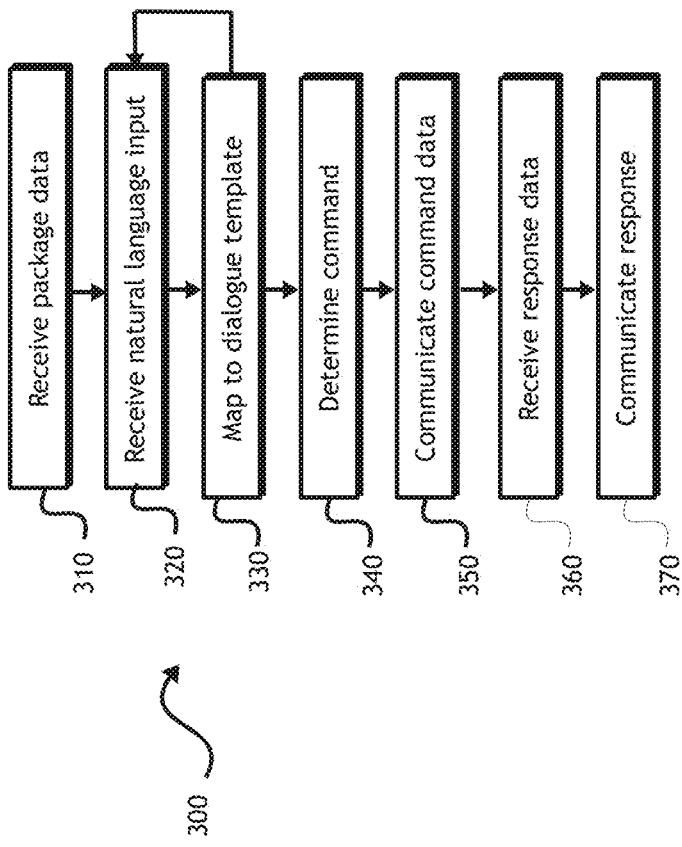
FIG. 3 is a flowchart of a non-limiting embodiment of a process for using an intelligent industrial assistant according to the principles of the presently disclosed subject matter.

Referring now to FIG. 3, FIG. 3 is a flowchart of a non-limiting embodiment of a process 300 for using an intelligent industrial assistant. In some non-limiting embodiments, one or more of the steps of process 300 may be performed (e.g., completely, partially, and/or the like) by intelligent industrial assistant 102 (e.g., one or more devices of intelligent industrial assistant 102). In some non-limiting embodiments, one or more of the steps of process 300 may be performed (e.g., completely, partially, and/or the like) by another system, another device, another group of systems, or another group of devices, separate from or including intelligent industrial assistant 102, such as interface device 101 (e.g., one or more devices of interface device 101), database 103a (e.g., one or more devices of database 103a), external database 103b (e.g., one or more devices of external database 103b), industrial machine 104 (e.g., one or more devices of industrial machine 104), user device 105, and/or remote server 106 (e.g., one or more devices of remote server 106).

As shown in FIG. 3, at step 310, process 300 may include receiving package data. For example, intelligent industrial assistant 102 may receive the package data (e.g., package 102cc and/or the like) from user device 105, remote system 106, installation by a user, and/or the like. In some non-limiting embodiments, the package data (e.g., package 102cc and/or the like) may include at least one dialogue template. For example, the package data (e.g., package 102cc and/or the like) may include a plurality of dialogue templates.

In some non-limiting embodiments, the package data (e.g., package 102cc and/or the like) may include at least one industrial machine interface (e.g., at least one machine interface of machine gateway 102e and/or the like) for at least one industrial machine 104 (e.g., a first industrial machine 104). Additionally or alternatively, at least one dialogue template (e.g., the first dialogue template) may be associated with at least one executable industrial machine operation (e.g., of the first industrial machine).

In some non-limiting embodiments, the package data (e.g., package 102*cc* and/or the like) may include at least one database interface 102*d*, e.g., a first database interface 102*d* for a first database (e.g., database 103*a* and/or external database 103*b*). Additionally or alternatively, at least one dialogue template (e.g., the first dialogue template) may be associated with retrievable data (e.g., from the first database).

In some non-limiting embodiments, the package data (e.g., package 102*cc* and/or the like) may include at least one of a media item (e.g., a user manual, a video recording, an audio recording, a combination thereof, and/or the like), a tabular list (e.g., an advanced list, a database list, a spreadsheet, and/or the like), a report template, a machine interface (e.g., at least one machine interface of machine gateway 102*e* and/or the like), a database interface, a combination thereof, and/or the like. For example, in some non-limiting embodiments, the package data may include a user manual. Additionally or alternatively, the each media item (e.g., user manual and/or the like) may include a plurality of media markers (e.g., bookmarks, indexes, time markers/offsets for video and/or audio media, row numbers, column numbers, page numbers, section numbers, portions, and/or the like). Additionally or alternatively, a dialogue template (e.g., first dialogue template, selected dialogue template, and/or the like) may be associated with at least one media marker (e.g., bookmark and/or the like) of the media item (user manual and/or the like).

In some non-limiting embodiments, the package data (e.g., package 102*cc* and/or the like) may include a tabular list. Additionally or alternatively, a dialogue template (e.g., first dialogue template, selected dialogue template, and/or the like) may be associated with at least one field of the tabular list (e.g., a field, a parameter, a row, a column, a page, a section, a portion, and/or the like of the tabular list).

In some non-limiting embodiments, the package data (e.g., package 102*cc* and/or the like) may include at least one machine interface (e.g., a first machine interface of machine gateway 102*e*) of a machine 104 (e.g., a first industrial machine). Additionally or alternatively, the (first) machine interface may include at least one of an application programming interface (API), a dynamic load library (DLL), a combination thereof, and/or the like associated with the (first) machine 104.

In some non-limiting embodiments, the package data (e.g., package 102*cc* and/or the like) may include a report template (e.g., a first report template). Additionally or alternatively, the (first) report template may include at least one of a history field, a filtering field, a statistics field, a calculation field, a warning field, an alarm field, a machine status field, a combination thereof, and/or the like. In some non-limiting embodiments, the report template may be customized and/or based on a machine 104, a database (e.g., database 103*a*, external database 103*b*, and/or the like), and/or a device (e.g., interface device 101, user device 105, remote system 106, and/or the like) associated with the report template.

As shown in FIG. 3, at step 320, process 300 may include receiving a natural language input. For example, intelligent industrial assistant 102 may receive natural language input from interface device 101, user device 105, a user, and/or the like. In some non-limiting embodiments, the natural langue input may be an audio input (e.g., a voice recording and/or the like), a textual input (e.g., a text message, an email, a chat message, text created by STT/ASR/NLU, HTML, and/or the like), and/or the like.

As shown in FIG. 3, at step 330, process 300 may include mapping at least a portion of the natural language input to at least a portion of one or more of the dialogue templates. For example, intelligent industrial assistant 102 may map at least a portion of the natural language input to at least a portion of a dialogue template (e.g., a first dialogue template and/or the like).

In some non-limiting embodiments, the package data (e.g., package 102*cc* and/or the like) may include a plurality of dialogue templates. Additionally or alternatively, intelligent industrial assistant 102 may select one of the dialogue templates (e.g., the first dialogue template) based on the first natural language input (e.g., based on the portion of the dialogue template mapped to the natural language input, based on the inferred intent of the user, and/or the like). In some non-limiting embodiments, intelligent industrial assistant 102 may determine that at least a portion of the natural language input may be mapped to at least a portion of expected dialogue associated with expected dialogue data of at least one (e.g., a first) dialogue template. For example, intelligent industrial assistant 102 may match at least a portion of the natural language input to at least a portion of expected dialogue associated with expected dialogue data of at least one (e.g., a first) dialogue template. In some non-limiting embodiments, intelligent industrial assistant 102 may map at least a portion of the natural language input to at least one parameter associated with parameter data of at least one (e.g., a first) dialogue template. In some non-limiting embodiments, intelligent industrial assistant 102 may map at least a portion of the natural language input to at least one group associated with group data of at least one (e.g., a first) dialogue template. In some non-limiting embodiments, when the natural language input includes voice/speech that is converted into speech (e.g., speech-to-text, automatic speech recognition, and/or the like, as described herein), a (first) confidence score may be calculated (e.g., for each word, for each group of words (e.g., a phrase), for the input as a whole, and/or the like) based on a probability that text accurately reflects the spoken word(s). Additionally or alternatively, a (second) confidence score may be calculated for the mapping of the natural language input to expected dialogue associated with expected dialogue data of at least one dialogue template (e.g., all dialogue templates of package data 102*c*, a subset of the dialogue templates (e.g., with at least one word matching the natural language input), and/or the like). Additionally or alternatively, the dialogue templates (e.g., subset of dialogue templates) may be ranked based on the (second) confidence score associated with each dialogue template (e.g., subset of dialogue templates). Additionally or alternatively, a dialogue template associated with a highest (second) confidence score may be selected as the dialogue template to which the natural language input is mapped. Additionally or alternatively, if the confidence score(s) (e.g., second confidence score, combination of first and second confidence scores, and/or the like) is sufficiently high (e.g., above a first threshold), intelligent industrial assistant 102 may proceed with the selected dialogue template. Additionally or alternatively, if the confidence score(s) (e.g., second confidence score, combination of first and second confidence scores, and/or the like) is below the first threshold and above a second threshold (which may be less than the first threshold), intelligent industrial assistant 102 may request confirmation (e.g., communicate a prompt requesting confirmation, as described herein). Additionally or alternatively, if the confidence score(s) (e.g., second confidence score, combination of first and second confidence scores, and/or the like) is below the second threshold, intelligent industrial assistant 102 may reject the input (e.g., communicate a warning indicating that no mapping was determined, communicate a prompt requesting additional natural language input, and/or the like, as described herein).

In some non-limiting embodiments, intelligent industrial assistant 102 may determine the natural language input is insufficient to map to a portion of the dialogue template (e.g., first dialogue template). For example, the natural language input may lack suitable information/data to be mapped to one or more parameters/fields of the dialogue template. In some non-limiting embodiments, intelligent industrial assistant 102 may communicate (e.g., to interface device 101, user device 105, and/or the like) a prompt requesting additional input to the user. Additionally or alternatively, intelligent industrial assistant 102 may receive a second natural language input form the user (e.g., from interface device 101, user device 105, and/or the like). In some non-limiting embodiments, intelligent industrial assistant 102 may map at least a portion of the second natural language input to the (first) dialogue template (e.g., to the parameters/fields of the first dialogue template to which information/data could not be mapped based on the initial natural language input).

In some non-limiting embodiments, the dialogue template (e.g., first dialogue template) may include a plurality of prompts associated with a plurality of parameters. Additionally or alternatively, intelligent industrial assistant 102 may determine at least a portion of the natural language input maps to at least one of the plurality of parameters. In some non-limiting embodiments, intelligent industrial assistant 102 may communicate (e.g., to interface device 101, user device 105, and/or the like) at least one prompt of the plurality of prompts requesting additional input to the user for a respective parameter of the plurality of parameters for which a portion of the natural language input was not mapped. Additionally or alternatively, intelligent industrial assistant 102 may receive further natural language input form the user (e.g., from interface device 101, user device 105, and/or the like) and/or map at least a portion of the further natural language input to the (first) dialogue template associated with the respective parameter. In some non-limiting embodiments, intelligent industrial assistant 102 may repeat communicating the prompt(s) and receiving the further natural language input(s) for each parameter for which a portion of the natural language input was not mapped.

As shown in FIG. 3, at step 340, process 300 may include determining at least one command based on the dialogue template(s) (e.g., first dialogue template). For example, intelligent industrial assistant 102 may determine command (s) based on the dialogue template(s) (e.g., first dialogue template) to which natural language input (or a portion thereof) has been mapped. In some non-limiting embodiments, the command(s) may be based on at least one action associated with the dialogue template.

In some non-limiting embodiments, intelligent industrial assistant 102 may determine the command(s) based on the action data, parameter data, group data, and/or the like associated with the first dialogue template. For example, the action data may be associated with (e.g., identify, include, and/or the like) at least one command. Additionally or alternatively, the command may include the value of the parameter based on a portion of the natural language input mapped to parameter data of the dialogue template. Additionally or alternatively, the command may be associated with (e.g., identify, be addressed to, and/or the like) a group based on the portion of the natural language input mapped to the group data.

In some non-limiting embodiments, intelligent industrial assistant 102 may communicate (e.g., to interface device 101, user device 105, the user, and/or the like) a prompt requesting confirmation for the command(s) based on the first dialogue template. Additionally or alternatively, intelligent industrial assistant 102 may receive (e.g., from interface device 101, user device 105, the user, and/or the like) a second natural language input. Additionally or alternatively, intelligent industrial assistant 102 may determine the user has confirmed the command(s) based on the second natural language input.

In some non-limiting embodiments or aspects, intelligent industrial assistant 102 may determine a first command associated with industrial machine 104. Additionally or alternatively, intelligent industrial assistant 102 may determine a second command associated with a database (e.g., database 103a and/or external database 103b).

In some non-limiting embodiments, the command may include recording a note based on at least a portion of the natural language input.

As shown in FIG. 3, at step 350, process 300 may include communicating command data associated with the command(s). For example, intelligent industrial assistant 102 may communicate command data associated with the command(s) to at least one of interface device 101, a database (e.g., database 103a, external database 103b, and/or the like via database interface 102d), industrial machine 104 (e.g., machine controller 104a via a machine interface), user device 105, remote system 106, and/or the like.

In some non-limiting embodiments, the command data may be associated with at least one executable industrial machine operation (e.g., of the first industrial machine 104). Additionally or alternatively, communicating the command data may include intelligent industrial assistant 102 transmitting the command data via a machine interface (e.g., first industrial machine interface of machine gateway 102e) to the first industrial machine 104 (e.g., a first machine controller 104a thereof).

In some non-limiting embodiments, the command data may be associated with retrievable data (e.g., from a first database). Additionally or alternatively, communicating the command data may include intelligent industrial assistant 102 transmitting the command data (e.g., via database interface 102d) to the first database (e.g., database 103a and/or external database 103b).

In some non-limiting embodiments, the command will be communicated (e.g., by intelligent industrial assistant 102) to at least one entity (e.g., industrial machine 104, database 103a, external database 103b, and/or the like) based on the at least a portion of the natural language input being mapped to a group associated with group data of the (first) dialogue template.

In some non-limiting embodiments, at least a portion of the dialogue template may be associated with at least one of an industrial machine and/or database. For example, intelligent industrial assistant 102 (e.g., application manager 102c) may determine one or more portions of the dialogue template is mapped to one or more databases (e.g., database 103a and/or external database 103b) and/or industrial machine 104. In some non-limiting embodiments, the mapping may be based on at least one ethnographic relationship, as further described below with reference to FIG. 4. In some non-limiting embodiments or aspects, such an ethnographic relationship may include a mapping(s) and/or cross-correlation(s) between functions performable by intelligent industrial assistant 102 (e.g., report, control, coach, calculate, plan, maintain, repair, teach, anticipate, record and/or the like) and task groups (e.g., task flows of users specific to the role of such user, such as machine operator, and/or the like). Additionally or alternatively, such an ethnographic relationship may be based on the role of the user, the content of one or more databases (e.g., database 103a and/or external database 103b), the functions performable by at least one industrial machine 104, and/or the like.

In some non-limiting embodiments or aspects, intelligent industrial assistant 102 may communicate (first) command data associated with a (first) command to industrial machine 104. Additionally or alternatively, intelligent industrial assistant 102 may communicate (second) command data a (second) command associated with a database (e.g., database 103a and/or external database 103b).

In some non-limiting embodiments or aspects intelligent industrial assistant 102 may format the command according to a command template from a plurality of predetermined command templates. For example, the command template may be based on the mapping of the portion(s) of the dialogue template to industrial machine 104 or the database (e.g., database 103a and/or external database 103b). In some non-limiting embodiments or aspects, the determination of the command template may be based on a role of the user. Additionally or alternatively, the determination of the command template may be based on at least one intent of the user. In some non-limiting embodiments or aspects, the intent of the user may be based on the role of the user.

In some non-limiting embodiments, the command data may be associated with at least one media marker (e.g., of a plurality of media markers). For example, each media marker may include a bookmark, an index, a time marker/offset for video and/or audio media, a row number, a column number, a page number, a section number, a portion, and/or the like. Additionally or alternatively, communicating the command data may include transmitting (e.g., by intelligent industrial assistant 102) the command data (e.g., to interface device 101, user device 105, and/or the like) to display the at least one media marker of a media item, e.g., the user manual (e.g., display the page, section, and/or the like of the user manual associated with the media marker/bookmark).

In some non-limiting embodiments, the command data may associated with at least one field of a tabular list (e.g., a field, a parameter, a row, a column, a page, a section, a portion, and/or the like of the tabular list). Additionally or alternatively, communicating the command data may include transmitting (e.g., by intelligent industrial assistant 102) the command data (e.g., to interface device 101, user device 105, and/or the like) to display the at least one field of the tabular list.

In some non-limiting embodiments, industrial machine 104 may perform a functions (e.g., process and/or the like) based on the command data (e.g., first command). Additionally or alternatively, industrial machine 104 may determine (first) response data based on (performance of, failure of, and/or the like) the function (e.g., process and/or the like). In some non-limiting embodiments or aspects, the database (e.g., database 103a and/or external database 103b) may determine (second) response data based on the request (e.g., second request/query).

In some non-limiting embodiments, the command may be communicated by intelligent industrial assistant 102 to a data storage device (e.g., of intelligent industrial assistant, database 103a, and/or the like) to store a note recorded based on at least a portion of the natural language input.

As shown in FIG. 3, at step 360, process 300 may include receiving response data. For example, intelligent industrial assistant 102 may receive response data (e.g., from industrial machine 104, database 103a, external database 103b, and/or the like) in response to the command data. In some non-limiting embodiments, intelligent industrial assistant 102 may receive (first) response data from industrial machine 104. Additionally or alternatively, intelligent industrial assistant 102 may receive (second) response data from a database (e.g., database 103a and/or external database 103b). In some non-limiting embodiments, intelligent industrial assistant 102 may combine the (first) response data from industrial machine 104 and the (second) response data from the database (e.g., database 103a and/or external database 103b) to form a single response.

As shown in FIG. 3, at step 370, process 300 may include communicating a response. For example, intelligent industrial assistant 102 may communicate a response to the user (e.g., interface device 101, user device 105, remote system 106, and/or the like) based on the response data.

In some non-limiting embodiments, a dialogue window may be displayed (e.g., by interface device 101, user device 105, and/or the like) to the user. Additionally or alternatively, the dialogue window may include text of the natural language input(s) (e.g., from the user(s)) and text of the response(s) (e.g., from intelligent industrial assistant 102).

In some non-limiting embodiments, intelligent industrial assistant 102 may communicate (e.g., to interface device 101, user device 105, remote system 106, and/or the like) certain information/data independent of (e.g., without receiving, not in response to, and/or the like) any natural language input. For example, intelligent industrial assistant 102 may receive event data (e.g., first event data) associated with an event (e.g., first event), e.g., from industrial machine 104, database 103a, external database 103b, remote system 106, and/or the like. In some non-limiting embodiments, the event may have a type. For example, the type may be an alarm, an alert, a report, a scheduled event and/or reminder, a sensor reading, and/or the like. In some non-limiting embodiments, industrial assistant 102 may communicate a message, prompt, and/or the like to the user (e.g., to interface device 101, user device 105, remote system 106, and/or the like) based on the event data. Additionally or alternatively, industrial assistant 102 may interrupt communication of response data, interrupt/stop a process of machine 104, and/or the like based on the event data (e.g., when communicating the message/prompt in response to the event data).

In some non-limiting embodiments, intelligent industrial assistant 102 may receive additional natural language input. Additionally or alternatively, at least a portion of process 300 (e.g., all steps, a subset of steps, any one step, and/or the like) may be repeated based on the additional natural language input.

In some non-limiting embodiments, additional natural language input may be mapped to a dialogue template associated with repeating the previous response by intelligent industrial assistant. Additionally or alternatively, intelligent industrial assistant 102 may determine a command to repeat the response, communicate the command to itself, receive (e.g., retrieve) response data associated with the previous response (e.g., from a data storage device of intelligent industrial assistant, database 103a, and/or the like), and communicate a response (e.g., a copy and/or repeat of the previous response) based on the retrieved response data.

Figure 4:
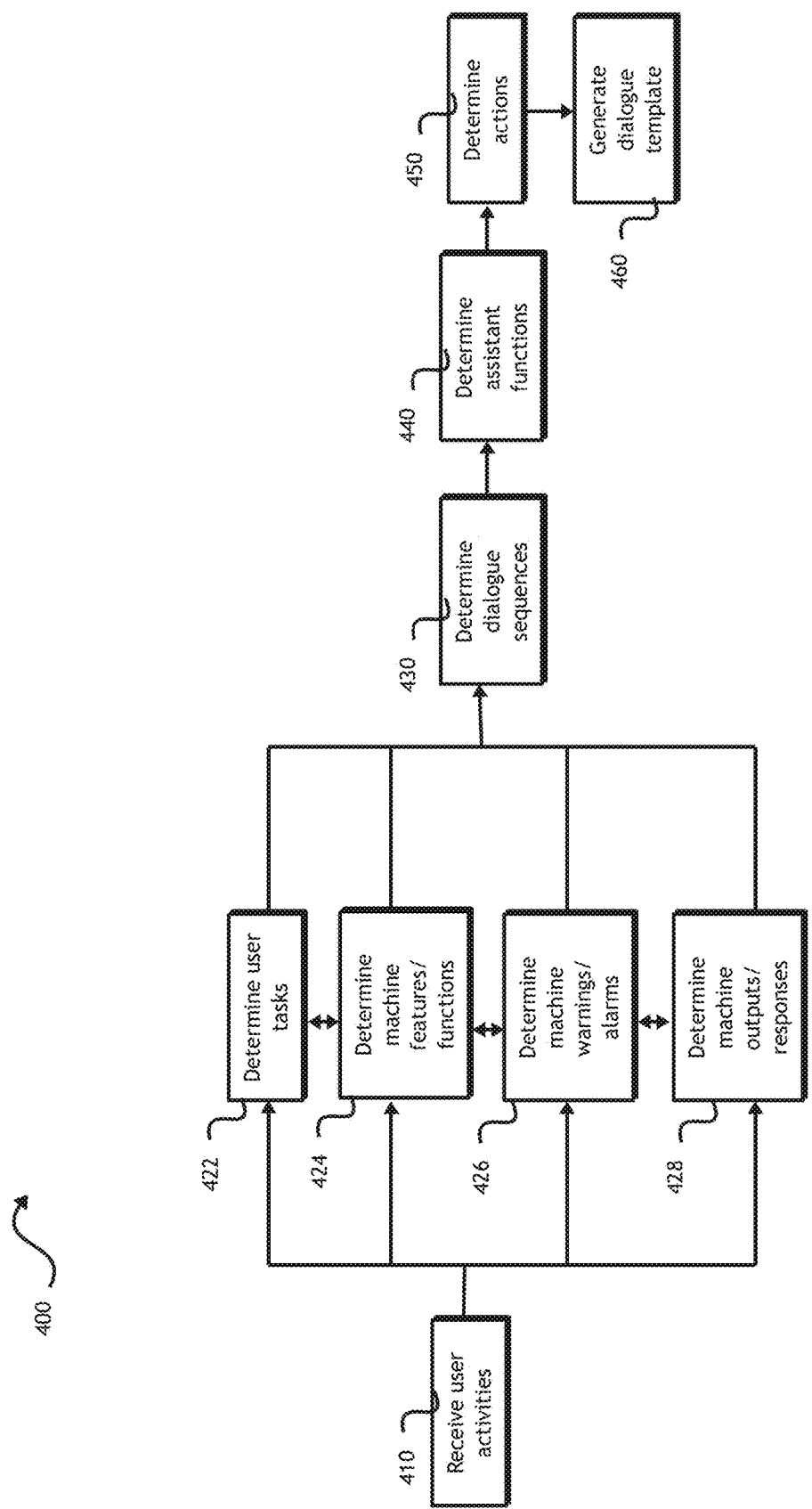
FIG. 4 is a flowchart of a non-limiting embodiment of a process for establishing an ethnographic relationship according to the principles of the presently disclosed subject matter.

Referring now to FIG. 4, FIG. 4 is a flowchart of a non-limiting embodiment of a process 400 for establishing an ethnographic relationship, which may be used with the process 300 shown in FIG. 3. In some non-limiting embodiments, one or more of the steps of process 400 may be performed (e.g., completely, partially, and/or the like) by intelligent industrial assistant 102 (e.g., one or more devices of intelligent industrial assistant 102). In some non-limiting embodiments, one or more of the steps of process 400 may be performed (e.g., completely, partially, and/or the like) by another system, another device, another group of systems, or another group of devices, separate from or including intelligent industrial assistant 102, such as interface device 101 (e.g., one or more devices of interface device 101), database 103a (e.g., one or more devices of database 103a), external database 103b (e.g., one or more devices of external database 103b), industrial machine 104 (e.g., one or more devices of industrial machine 104), user device 105, and/or remote server 106 (e.g., one or more devices of remote server 106).

In some non-limiting embodiments, ethnography may include studying (e.g., observing, receiving activity data regarding, and/or the like) at least one member of a group (e.g., a group of users with a same or similar role). For example, groups of users may include a group of users with roles as machine operators (e.g., of a particular type of machine, a particular model of machine, a set of machines at a particular factory, and/or the like), a group of users with roles as supervisors (e.g., of machine operators, factories, and/or the like), a group of users with roles as manufacturing engineers, a group of users with roles as maintenance personnel, a group of users with roles as salesmen, a group of users with roles as field service engineers, and/or the like. Additionally or alternatively, establishing ethnographic relationships may include generating at least one dialogue template based on at least one activity of at least one member of a group.

As shown in FIG. 4, at step 410, process 400 may include receiving user activity data associated with at least one user activity. For example, intelligent industrial assistant 102 (and/or another device separate from or including intelligent industrial assistant 102, such as interface device 101, database 103a, external database 103b, industrial machine 104, user device 105, and/or remote server 106) may receive user activity data from a user (e.g., operator of an industrial machine and/or the like), from an observer of such a user, and/or the like. In some non-limiting embodiments, the activity data may include at least one activity (e.g., task; action; report; any combination thereof; any sequence, group, flow, and/or the like thereof; and/or the like). In some non-limiting embodiments, the activity (or activities) of the user may be specific to the role of such user (e.g., machine operator and/or the like).

As shown in FIG. 4, at step 422, process 400 may include determining user tasks based on the user activity data. For example, intelligent industrial assistant 102 (and/or another device separate from or including intelligent industrial assistant 102, such as interface device 101, database 103a, external database 103b, industrial machine 104, user device 105, and/or remote server 106) may determine user tasks based on the activity data. For example, intelligent industrial assistant 102 may parse the activity data to identify individual tasks.

As shown in FIG. 4, at step 424, process 400 may include determining machine features based on the user tasks. For example, intelligent industrial assistant 102 (and/or another device separate from or including intelligent industrial assistant 102, such as interface device 101, database 103a, external database 103b, industrial machine 104, user device 105, and/or remote server 106) may determine machine features (e.g., functions, commands, variables, fields, inputs, outputs, any combination thereof, and/or the like) based on the user tasks. In some non-limiting embodiments, intelligent industrial assistant 102 may determine the machine features based on a predetermined mapping between at least one user task and at least one machine feature. Additionally or alternatively, intelligent industrial assistant 102 may receive input from a user (e.g., machine operator), an observer of the user, and/or the like associating at least one user task with at least one machine feature.

As shown in FIG. 4, at step 426, process 400 may include determining possible machine warnings based on the user tasks and/or the machine features. For example, intelligent industrial assistant 102 (and/or another device separate from or including intelligent industrial assistant 102, such as interface device 101, database 103a, external database 103b, industrial machine 104, user device 105, and/or remote server 106) may determine possible machine warnings (e.g., alarms, alerts, and/or the like) based on the user tasks and/or the machine features. In some non-limiting embodiments, intelligent industrial assistant 102 may determine possible machine warnings based on a predetermined mapping between at least one machine warning and at least one machine feature. Additionally or alternatively, intelligent industrial assistant 102 may receive input from a user (e.g., machine operator), an observer of the user, and/or the like associating at least one possible machine warning with at least one machine feature.

As shown in FIG. 4, at step 428, process 400 may include determining possible machine responses. For example, intelligent industrial assistant 102 (and/or another device separate from or including intelligent industrial assistant 102, such as interface device 101, database 103a, external database 103b, industrial machine 104, user device 105, and/or remote server 106) may determine possible machine responses (e.g., outputs, response messages, reports, warnings, and/or the like) based on at least one of the user tasks, the machine features, the possible machine warnings, any combination thereof, and/or the like. In some non-limiting embodiments, intelligent industrial assistant 102 may determine possible machine responses based on a predetermined mapping between at least one possible machine responses and at least one machine feature. Additionally or alternatively, intelligent industrial assistant 102 may receive input from a user (e.g., machine operator), an observer of the user, and/or the like associating at least one possible machine response with at least one machine feature.

As shown in FIG. 4, at step 430, process 400 may include determining a dialogue sequence. For example, intelligent industrial assistant 102 (and/or another device separate from or including intelligent industrial assistant 102, such as interface device 101, database 103a, external database 103b, industrial machine 104, user device 105, and/or remote server 106) may determine at least one dialogue sequence based on at least one of the user tasks, the machine features, the possible machine warnings, the possible machine responses, any combination thereof, and/or the like. In some non-limiting embodiments, intelligent industrial assistant 102 may determine the dialogue sequence(s) based on a predetermined mapping between at least one dialogue sequence and at least one of the user tasks, the machine features, the possible machine warnings, the possible machine responses, any combination thereof, and/or the like. Additionally or alternatively, intelligent industrial assistant 102 may receive input from a user (e.g., machine operator), an observer of the user, and/or the like associating at least one dialogue sequence with at least one of the user tasks, the machine features, the possible machine warnings, the possible machine responses, any combination thereof, and/or the like.

As shown in FIG. 4, at step 440, process 400 may include determining applicable functions of intelligent industrial assistant 102. For example, intelligent industrial assistant 102 (and/or another device separate from or including intelligent industrial assistant 102, such as interface device 101, database 103a, external database 103b, industrial machine 104, user device 105, and/or remote server 106) may determine at least one applicable function of intelligent industrial assistant 102 based on at least one of the user tasks, the machine features, the possible machine warnings, the possible machine responses, the dialogue sequences, any combination thereof, and/or the like. In some non-limiting embodiments, intelligent industrial assistant 102 may determine the applicable function(s) of intelligent industrial assistant 102 based on a predetermined mapping between at least one function of industrial assistant 102 and at least one of the user tasks, the machine features, the possible machine warnings, the possible machine responses, the dialogue sequences, any combination thereof, and/or the like. Additionally or alternatively, intelligent industrial assistant 102 may receive input from a user (e.g., machine operator), an observer of the user, and/or the like associating at least one function of industrial assistant 102 with at least one of the user tasks, the machine features, the possible machine warnings, the possible machine responses, the dialogue sequences, any combination thereof, and/or the like.

As shown in FIG. 4, at step 450, process 400 may include determining actions. For example, intelligent industrial assistant 102 (and/or another device separate from or including intelligent industrial assistant 102, such as interface device 101, database 103a, external database 103b, industrial machine 104, user device 105, and/or remote server 106) may determine at least one action based on at least one of the applicable functions of intelligent industrial assistant 102, the user tasks, the machine features, the possible machine warnings, the possible machine responses, the dialogue sequences, any combination thereof, and/or the like. In some non-limiting embodiments, intelligent industrial assistant 102 may determine the actions(s) based on a predetermined mapping between at least one action and at least one applicable functions of intelligent industrial assistant 102. Additionally or alternatively, intelligent industrial assistant 102 may receive input from a user (e.g., machine operator), an observer of the user, and/or the like associating at least one action with at least one of the applicable functions of intelligent industrial assistant 102, the user tasks, the machine features, the possible machine warnings, the possible machine responses, the dialogue sequences, any combination thereof, and/or the like.

As shown in FIG. 4, at step 460, process 400 may include generating at least one dialogue template. For example, intelligent industrial assistant 102 (and/or another device separate from or including intelligent industrial assistant 102, such as interface device 101, database 103a, external database 103b, industrial machine 104, user device 105, and/or remote server 106) may generate a dialogue template based on at least one of the applicable functions of intelligent industrial assistant 102, the user tasks, the machine features, the possible machine warnings, the possible machine responses, the dialogue sequences, the actions, any combination thereof, and/or the like. For example, a dialogue template may include at least one of function data, group data, feature data, sequence data, parameter data, expected dialogue data, action data, any combination thereof, and/or the like, each of which may be determined at least in part based on at least one of the applicable functions of intelligent industrial assistant 102, the user tasks, the machine features, the possible machine warnings, the possible machine responses, the dialogue sequences, the actions, any combination thereof, and/or the like. In some non-limiting embodiments, the dialogue template may be generated based on a predetermined mapping between at least a portion of at least one of the applicable functions of intelligent industrial assistant 102, the user tasks, the machine features, the possible machine warnings, the possible machine responses, the dialogue sequences, the actions, any combination thereof, and/or the like and at least one of function data, group data, feature data, sequence data, parameter data, expected dialogue data, action data, any combination thereof, and/or the like. Additionally or alternatively, input may be received from a user (e.g., machine operator), an observer of the user, and/or the like associating at least a portion of at least one of the applicable functions of intelligent industrial assistant 102, the user tasks, the machine features, the possible machine warnings, the possible machine responses, the dialogue sequences, the actions, any combination thereof, and/or the like with at least one of function data, group data, feature data, sequence data, parameter data, expected dialogue data, action data, any combination thereof, and/or the like.

Figure 5:
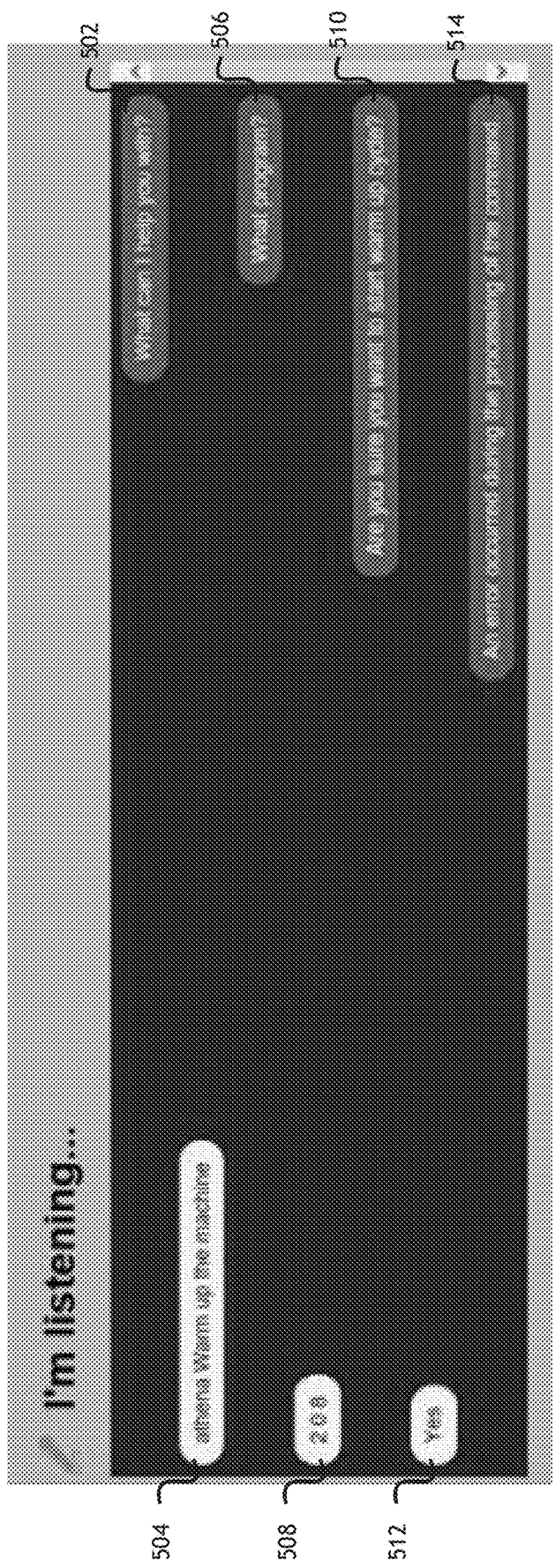
FIG. 5 is a screenshot of an exemplary dialogue window according to a non-limiting implementation of the process of FIG. 3, according to principles of the presently disclosed subject matter.

Referring now to FIG. 5, FIG. 5 is a screenshot of an exemplary dialogue window according to a non-limiting implementation of the process 300 shown in FIG. 3. As shown in FIG. 5, in some non-limiting embodiments, a dialogue window may include unsolicited message 502. For example, an unsolicited message may certain information/data independent of (e.g., without receiving, not in response to, and/or the like) any natural language input. For the purpose of illustration, as shown in FIG. 5, unsolicited message 502 may be associated with a prompt from intelligent industrial assistant 102 to the user to initiate a (first) natural language input.

As shown in FIG. 5, in some non-limiting embodiments, the dialogue window may include a first natural language input 504. For example, first natural language input 504 may be displayed in response to intelligent industrial assistant 102 receiving the first natural language input 504, as described herein.

As shown in FIG. 5, in some non-limiting embodiments, the dialogue window may include a first prompt 506 requesting additional natural language input, as described herein. For example, first prompt 506 may be displayed in response to intelligent industrial assistant 102 determining that the first natural language input 504 was not sufficient (e.g., lacked required information) for mapping to at least one dialogue template.

As shown in FIG. 5, in some non-limiting embodiments, the dialogue window may include a second natural language input 508. For example, second natural language input 508 may be displayed in response to intelligent industrial assistant 102 receiving the second natural language input 508, as described herein.

As shown in FIG. 5, in some non-limiting embodiments, the dialogue window may include a second prompt 510 requesting confirmation, as described herein. For example, second prompt 506 may be displayed in response to intelligent industrial assistant 102 determining receiving the second natural language input 508 and mapping the first and second natural language inputs to at least one dialogue template, as described herein.

As shown in FIG. 5, in some non-limiting embodiments, the dialogue window may include a third natural language input 512. For example, third natural language input 512 may be displayed in response to intelligent industrial assistant 102 receiving the third natural language input 512, as described herein.

As shown in FIG. 5, in some non-limiting embodiments, the dialogue window may include a response 514, as described herein. For example, response 514 may be displayed in response to intelligent industrial assistant 102 communicating a command (e.g., to industrial machine 104) and/or receiving a response (e.g., from industrial machine 104), as described herein.

For the purpose of illustration, Table 1 includes exemplary descriptions of exemplary functions of intelligent industrial assistant 102:

TABLE 1

| Function | Exemplary Description | Example |
| --- | --- | --- |
| Coach | Coaching a user on (e.g., walking a user through) machine operation and maintenance, | How to change a tool, show me how to reset an alarm, tell me machine options |
| Report | Reporting machine operation statistics and history. | Data, sensors, facts, history, readings, information |
| Control | Controlling machine operation. | Turn on/off, run program, change tool, check status |
| Calculate | Performing calculations and analysis from monitored equipment (e.g., machine) data | Cpk, cost per part, scrap cost last shift, Part count next shift |
| Plan | Managing (e.g., scheduling) machinery and equipment for actions to be taken in the future. | Best practice guidelines, work in progress, cleaning a filter (when do I need to) |
| Maintain | Maintaining tools, machinery, the environment, etc., including preventative maintenance. | Prompt fluid checks, cleaning tools, adjustments, inspection checklists |
| Repair | Providing information regarding tools or machinery that needs to be repaired or may need to be repaired in the future | Procedures, checklists, escalation of help, diagnostics |
| Teach | Teaching (e.g., training) a user about machine operation and maintenance. | Material properties, vibration lobe, measuring techniques (weight, force, distance) |
| Anticipate | Accessing content that allows a user to plan ahead for possible events | Tooling needs, set up timing, parts flow, logistics |
| Record | Recording (e.g., documenting) events (e.g., sensor readings, statistics, maintenance actions, reports, and/or the like) and storing records | Checklists, recorded maintenance or steps, alarm history report (system report) |

For the purpose of illustration, Table 2 includes examples of expected dialogue for exemplary dialogue templates for intelligent industrial assistant 102:

TABLE 2

| Function | Expected Dialogue | Parameters |
| --- | --- | --- |
| Calculate | When will the current program finish? When will the running program finish? When will the current NC program finish? When will the current program end? When will the current NC program end? Time to finish the program | |
| Calculate | When do I need to replace the tool (turret position#) What is tool remaining life What is remaining tool life When do I need to replace the tool <toolNumber> What is <toolNumber> remaining life What is remaining tool life for <toolNumber> | <toolNumber> |
| Calculate | Notify me before current program ends. Inform me before program ends Notify me <timeCount> <timeFrequency> before the current program ends. Inform me <timeCount> <timeFrequency> before program ends | <minutesTimer> |

TABLE 2-continued

| Function | Expected Dialogue | Parameters |
|---|---|---|
| Control | Call tool to ready position<br>Call tool to standby position<br>Move tool to ready position<br>Move tool to standby position<br>Set tool to ready position<br>Set tool to standby position<br>Put tool to ready position<br>Put tool to standby position<br>Call tool <toolNumber> to ready position<br>Call tool <toolNumber> to standby position<br>Move tool <toolNumber> to ready position<br>Move tool <toolNumber> to standby position<br>Set tool <toolNumber> to ready position<br>Set tool <toolNumber> to standby position<br>Put tool <toolNumber> to ready position<br>Put tool <toolNumber> to standby position | <toolNumber> |
| Control | I would like to change the tool.<br>Change the tool<br>I want to change the tool<br>Tool change<br>Change the spindle tool<br>Change to tool<br>Change spindle tool<br>Load the tool<br>I would like to change the tool to <toolNumber><br>Change the tool to <toolNumber><br>I want to change to tool <toolNumber><br>Change to tool <toolNumber><br>Tool change <toolNumber><br>Change the spindle tool to <toolNumber><br>Change to tool <toolNumber><br>Change spindle tool to <toolNumber><br>Load the tool <toolNumber> | <toolNumber> |
| Control | Remove spindle tool<br>Empty spindle<br>Empty the spindle<br>Empty spindle tool<br>Empty the spindle tool | |
| Control | Change the pallet.<br>I want to change the pallet.<br>Pallet change.<br>Switch the pallet<br>Load pallet<br>Change the pallet <palletNumber><br>I want to change the pallet <palletNumber><br>Pallet change to <palletNumber><br>Switch the pallet <palletNumber><br>Load pallet <palletNumber> | <palletNumber> |
| Control | Turn the coolant on.<br>Turn on the coolant<br>Start the coolant.<br>Resume the coolant.<br>Enable coolant.<br>Coolant on.<br>Coolant start.<br>Turn coolant on<br>Turn <coolantName> coolant on.<br>Turn on <coolantName> coolant<br>Start <coolantName> coolant.<br>Resume <coolantName> coolant.<br>Enable <coolantName> coolant.<br><coolantName> coolant on.<br><coolantName> coolant start.<br>Turn <coolantName> coolant on | <coolantName> |
| Control | Turn the coolant off.<br>Turn off the coolant<br>Stop the coolant.<br>Pause the coolant.<br>Disable coolant.<br>Coolant off.<br>Coolant stop.<br>Turn coolant off.<br>Turn off all coolants | <coolantName> |
| Control | Turn on the spindle.<br>Turn the spindle on<br>Spindle rotate<br>Rotate the spindle. | <spindleSpeed><br><spindleDirection> |

TABLE 2-continued

| Function | Expected Dialogue | Parameters |
|---|---|---|
| | Start spindle rotation. | |
| | Spindle on. | |
| | Spindle start. | |
| | Turn spindle on | |
| | Turn on the spindle at <spindleSpeed> | |
| | Turn the spindle on <spindleSpeed> | |
| | Spindle rotate at <spindleSpeed> | |
| | Rotate the spindle at <spindleSpeed> | |
| | Start spindle rotation at <spindleSpeed> | |
| | Spindle on at <spindleSpeed> | |
| | Spindle start at <spindleSpeed> | |
| | Turn on the spindle <spindleDirection> | |
| | Turn the spindle on <spindleDirection> | |
| | Spindle rotate <spindleDirection> | |
| | Rotate the spindle <spindleDirection> | |
| | Start spindle rotation <spindleDirection> | |
| | Spindle on <spindleDirection> | |
| | Spindle start <spindleDirection> | |
| | Turn on the spindle <spindleDirection> at <spindleSpeed> | |
| | Turn the spindle on <spindleDirection> at <spindleSpeed> | |
| | Spindle rotate <spindleDirection> at <spindleSpeed> | |
| | Rotate the spindle <spindleDirection> at <spindleSpeed> | |
| | Start spindle rotation <spindleDirection> at <spindleSpeed> | |
| | Spindle on <spindleDirection> at <spindleSpeed> | |
| | Spindle start <spindleDirection> at <spindleSpeed> | |
| Control | Turn off the spindle. | |
| | The the spindle off | |
| | Stop the spindle. | |
| | Stop spindle rotation. | |
| | Spindle off. | |
| | Spindle stop. | |
| Control | Clamp the spindle tool. | |
| | Spindle clamp | |
| | Hold the tool. | |
| | Clamp the tool. | |
| | Clamp tool. | |
| Control | Unclamp the spindle tool. | |
| | Unclamp spindle | |
| | Unclamp the tool. | |
| | Unclamp the spindle tool. | |
| | Unclamp the tool from the spindle. | |
| | Unclamp tool. | |
| | Release the tool. | |
| Control | Auto Zero. | |
| | Return to origin. | |
| | Return to zero position | |
| | Run auto zero | |
| Control | Warm up the machine | |
| | Begin warm up cycle | |
| | Start warm up cylce | |
| | Start warm up program | |
| Control | Feed Hold. | |
| | Pause the program. | |
| | Pause the cycle. | |
| | Pause machine. | |
| | Machine stop | |
| | Stop machine | |
| | Stop | |
| | Pause | |
| Control | Turn the lights on. | |
| | Lights on. | |
| | Turn on the lights. | |
| | Work light on. | |
| | Turn the lights on | |

TABLE 2-continued

| Function | Expected Dialogue | Parameters |
|---|---|---|
| Control | I would like to run NC program.<br>Run NC program.<br>Run program<br>I would like to run NC program <programNumber><br>Run NC program <programNumber><br>Start the cycle.<br>Run program <programNumber> | <programNumber> |
| Control | Switch mode<br>Shift mode<br>Change mode<br>Switch mode to <modeName><br>Shift mode to <modeName><br>Change mode to <modeName> | <modeName> |
| Control | Verify all door interlock status<br>Check all door interlock<br>Verify interlocks are secure.<br>Is the machine in safe mode<br>Verify all interlocks are satisfied. | |
| Control | Spindle Orient<br>Orient the spindle.<br>Do spindle orient<br>Orient spindle | |
| Control | Set z axis neglect<br>z axis neglect<br>Enable z axis neglect<br>z axis retract<br>Neglect z axis<br>Retract Z axis | |
| Control | Alarm Reset.<br>Reset the alarm.<br>Reset alarm.<br>Alarm reset | |
| Control | Return to reference position<br>Put machine into reference position<br>Go to reference position<br>Move to reference position<br>Set to reference position<br>Reference position<br>Put machine into reference position <referencePosition><br>Go to reference position <referencePosition><br>Move to reference position <referencePosition><br>Set to reference position <referencePosition><br>Reference position to <referencePosition> | <referencePosition> |
| Control | Select Program<br>Get the program<br>I need the program<br>Bring up the program<br>Load the program<br>Find the program<br>Locate the program<br>Choose the program<br>Where is the program<br>Activate program<br>Select program<br>Select Program <programNumber><br>Get the program <programNumber><br>I need the program <programNumber><br>Bring up the program <programNumber><br>Load the program <programNumber><br>Find the program <programNumber><br>Locate the program <programNumber><br>Choose the program <programNumber><br>Where is the program <programNumber><br>Activate program <programNumber><br>Select program <programNumber> | <programNumber> |
| Control | Run Set Up Position<br>Set up position<br>Go to setup position<br>Return to set up position | |

TABLE 2-continued

| Function | Expected Dialogue | Parameters |
|---|---|---|
| Control | Set spindle speed<br>Change the spindle speed<br>Set the spindle speed<br>Set the spindle speed to <spindleSpeed><br>Set spindle speed to <spindleSpeed><br>Spindle speed to <spindleSpeed><br>Change the spindle speed to <spindleSpeed> | <spindleSpeed> |
| Control | Warm up the spindle<br>Warm up spindle<br>Spindle warm up<br>Do the spindle warm up | |
| Report | Report overrides.<br>May I have all overrides?<br>Give all overrides.<br>Display all overrides.<br>State overirdes | |
| Report | Report rapid override.<br>Report rapid rate override<br>Rapid override.<br>Give rapid override.<br>Provide rapid override | |
| Report | Report feedrate override<br>Feed override.<br>Give feed override.<br>Provide feed override | |
| Report | Report spindle override.<br>Spindle override.<br>Give spindle override.<br>Provide spindle override | |
| Report | Display the tool data table.<br>Show the tool data table.<br>Tool data table.<br>Tool data.<br>Give me tool data table | |
| Report | Report peak spindle load.<br>Report the peak spindle load.<br>Provide peak spindle load<br>Give me the peak spindle load.<br>What is the peak spindle load?<br>Peak spindle load. | |
| Report | What is the current table pallet.<br>Show me the current table pallet.<br>What is the table pallet?<br>What is the current pallet? | |
| Report | Report current spindle speed<br>Current spindle speed<br>Give me current spindle speed<br>What is the current spindle speed<br>Provide current spindle speed<br>What is the spindle speed | |
| Report | State current feed speed.<br>What is the current feedrate?<br>Give me the current feedrate.<br>Current feedrate.<br>Report current feedrate. | |
| Report | Empty slots in magazine<br>What tool positions in the magazine are empty?<br>Empty positions in magazine<br>What are the empty positions in magazine<br>What are the empty slots in magazine<br>Empty pot numbers | |
| Report | How many tools are in the magazine?<br>How many pots are used in magazine?<br>Tell me how many tools are in the magazine?<br>What are the tools in the magazine<br>Tools in magazine. | |
| Report | Tell me the current machine status.<br>Current machine status<br>What is the machine status?<br>Give me the machine status.<br>Machine status. | |
| Report | What tool is in the spindle?<br>What is the current tool?<br>Tell me the current tool in the spindle?<br>Current spindle tool. | |

TABLE 2-continued

| Function | Expected Dialogue | Parameters |
|---|---|---|
| Report | What program is running?<br>Current running program<br>What is the current running program<br>Which program is running? | |
| Report | How many tools are in warning?<br>Total tools in warning.<br>Total tool warnings | |
| Report | How many tools are in alarm?<br>Total tools in alarm.<br>Total tool alarms | |
| Report | How many machine warnings are there?<br>Total machine warnings. | |
| Report | How many machine alarms are there?<br>Total machine alarms. | |
| Report | What tools are in warnings?<br>Which tools are in warnings?<br>Report which tools are in warning<br>What tools are in warning<br>Report what tools are in warning<br>Tools in warning<br>List tools in warning | |
| Report | What tools are in alarm?<br>Which tools are in alarm?<br>Report which tools are in alarm<br>What tools are in alarm<br>Report what tools are in alarm<br>Tools in alarm<br>List tools in alarm | |
| Report | What are the current machine warnings?<br>Report machine warnings<br>What are the machine warnings<br>Report machine warnings<br>Machine warnings<br>List machine warnings | |
| Report | What are the current machine alarms?<br>Report machine alarms<br>What are the machine alarms<br>Report machine alarms<br>Machine alarms<br>List machine alarms | |
| Report | Report tool in the spindle.<br>Report current tool.<br>Inform about current tool.<br>State of current tool<br>Data on current tool | |
| Report | Available pots in magazine.<br>How many more tools can my magazine hold?<br>How many pots are available in the magazine?<br>How many empty pots does my ATC magazine have? | |
| Report | What tool is in ready position?<br>Which tool is ready position?<br>Tool in ready position | |
| Report | Report the pallet ready state.<br>Is pallet ready<br>Report current pallet ready state<br>Current pallet state<br>Pallet state<br>What is pallet ready state<br>What is curent pallet state | |
| Report | Report tool dimensions.<br>Provide tool dimensions.<br>What are the tool dimensions?<br>Tool dimensions.<br>Provide tool dimensions for <toolnumber><br>What are the tool dimensions for <toolnumber><br>Tool dimensions for <toolnumber> | <toolnumber> |
| Report | Is the machine warmed up?<br>Is spindle ready? | |
| Report | Report tool<br>Provide details on tool<br>Report tool <toolNumber><br>Provide details on tool | <toolnumber> |

TABLE 2-continued

| Function | Expected Dialogue | Parameters |
|---|---|---|
| Report | What is the pallet on load station. | |
| | Show me the pallet on load station | |
| | Which pallet is on load station? | |
| | Which pallet is on the load station? | |
| | Pallet on load station | |
| Report | Display Program List | |
| | Display the program list | |
| | Show me the program list | |
| | Show program list | |
| | Open program list | |
| | List the programs | |
| | Report program list | |
| Report | What is the current tool lifeLife of tool | |
| | What is tool life | |
| | Tell me tool life | |
| | Give me tool life | |
| | Report tool life for tool <toolNumber> | |
| | Life of tool <toolNumber> | |
| | What is tool life of <toolNumber> | |
| | Tell me tool life of <toolNumber> | |
| | Give me tool life of <toolNumber> | |
| Control | Rotate spindle clockwise <degrees> degrees. | <degrees> |
| Control | Rotate spindle counter-clockwise <degrees> degrees. | <degrees> |
| Control | Index turret to position <turretposition> | <turretposition> |
| Control | Move Tailstock forward to <turretposition> | <tailstockposition> |
| Control | Retract Tailstock to <turretposition> | <tailstockposition> |
| Control | Set tool number <toolnumber> | <toolnumber> |
| Control | Jog "X" axis to Position <axisposition> | <axisposition> |
| Control | Adjust tool coolant pressure to <coolantpressure> | <coolantpressure> |
| Control | All stop | |
| Control | Open door | |
| Control | Close door | |
| Control | Wash Down | |
| Control | Turn on Through tool <turretposition> coolant | <turretposition> |
| Control | Turn off Through tool <turretposition> coolant | <turretposition> |
| Control | Turn off coolant | |
| Control | Close chuck | |
| Control | Open chuck | |
| Control | Chip conveyor start | |
| Control | Chip conveyor stop | |
| Control | Change spindle to low gear | |
| Control | Change Spindle to high gear | |
| Control | Jog "Z" axis to <axisposition> position | <axisposition> |
| Control | X axis Feed override to <overridepercent> | <overridepercent> |
| Control | Z axis Feed override to <overridepercent> | <overridepercent> |
| Control | Dry run Program <programnumber> | <programnumber> |
| Control | Single Block <programnumber> | <programnumber> |
| Control | Cycle Start | |
| Control | Display Tool Geometry Page | |
| Control | Display Machine Offset Page | |
| Control | Z face Measure | |
| Control | Next Tool <toolposition> | <toolposition> |
| Control | X Diameter Measure | |
| Control | Spindle to Neutral | |
| Calculate | When will the current program finish? | |
| | When will the running program finish? | |
| | When will the current NC program finish? | |
| | When will the current program end? | |
| | When will the current NC program end? | |
| | Time to finish the program | |
| Calculate | What is the remaining time on the current work order? | |
| | Finish time for the current work order? | |
| | Work order remaining time | |
| | Order remaining time | |
| | Remaining time for current work order | |
| | When will current work order finish? | |
| Calculate | Parts left on the work order. | |
| | Parts left for the work order. | |
| | Work order remaining parts. | |
| | Remaining parts in work order | |
| | How many parts are remaining in the work order? | |

TABLE 2-continued

| Function | Expected Dialogue | Parameters |
|---|---|---|
| Calculate | How many parts have been produced for the work order? What is work order production? Produced parts in work order Parts produced in work order | |
| Calculate | State current spindle utilization rate. What is the current spindle utilization rate? Current spindle Utilization rate What is spindle utilization rate right now? | |
| Calculate | Display the calculator Show the calculator Run the calculator Launch the calculator View the calculator Open the calculator Display calculator Open calculator | |
| Coach | How do I change a tool? Show me how to change a tool. How to change a tool. | |
| Coach | How do I reset the alarm? Show me how to reset the alarm What can I do to reset the alarm? How can I reset an alarm? How do I reset an alarm? | |
| Coach | How do I insert a tool in the magazine? Show me how to insert a tool in the magazine How to insert tool in magazine | |
| Coach | Bring up display for M code list Display M code list Show M code list M code list | |
| Coach | Display the G codes What are the G codes? Bring up the G codes manual Show G code manual Open G code manual I need the G codes | |
| Coach | What options does the machine have? Machine options Tell me the Machine options Give me the Machine options What are the Machine options? | |
| Coach | How do I restart the control? Show me how to restart the control Instruct me on how to restart the control | |
| Coach | Take a note Write a note Jot this down Start notes Open notes Write this down | |
| Coach | Display startup checklist Provide a startup list Open a startup check list Machine startup list Give me startup instructions Startup instructions Startup checklist | |
| Coach | How do I calibrate the probe? Probe calibration instructions How to calibrate probe? Calibrate Probe instructions Instruct me on how to calibrate the probe Give me instructions to calibrate the probe | |
| Coach | What are the general safety precautions? Give the general safety precautions Show the general safety precautions Display the general safety precautions General safety information General safety precautions Provide general safety information Safety information | |
| Coach | What are the machine safety features? Display the machine safety features Provide machine safety features Give the machine safety features | |

TABLE 2-continued

| Function | Expected Dialogue | Parameters |
|---|---|---|
| | Show the machine safety features | |
| | Give machine safety features | |
| | Show machine safety features | |
| | Machine safety features | |
| Coach | What are tooling safety features? | |
| | Provide tooling safety features | |
| | Give tooling safety features | |
| | Show tooling safety features | |
| | Display tooling safety features | |
| | Tooling safety features | |
| | What are workpiece safety features? | |
| | Provide workpiece safety features | |
| | Give workpiece safety features | |
| | Show workpiece safety features | |
| | Display workpiece safety features | |
| | Workpiece safety features | |
| | What are coolant safety features? | |
| | Provide coolant safety features | |
| | Give coolant safety features | |
| | Show coolant safety features | |
| | Display coolant safety features | |
| | Coolant safety features | |
| Coach | What are the machine assemblies? | |
| | What are the machine components? | |
| | Give the machine assemblies | |
| | Show the machine assemblies | |
| | Display the machine assemblies | |
| | List the machine assemblies | |
| | Give the machine components | |
| | Show the machine components | |
| | Display the machine components | |
| | List the machine components | |
| | What are the machine components for? | |
| | What are the machine assemblies for? | |
| | Machine component information | |
| | Give machine component information | |
| | Show machine component information | |
| | Display machine component information | |
| | List machine component information | |
| Coach | What is operator panel control function? | |
| | What does operator panel control do? | |
| | Display operator panel control information | |
| | Give operator panel control information | |
| | Provide operator panel control information | |
| | What is op panel function? | |
| | What does op panel do? | |
| | Give op panel information | |
| | Display op panel information | |
| | Provide op panel information | |
| Coach | What are the machine functions? | |
| | Give machine functions | |
| | Show machine functions | |
| | Display machine functions | |
| | Provide machine functions | |
| Coach | How do I use the MPG? | |
| | What does MPG do? | |
| | What does manual pulse generator do? | |
| | Display MPG information | |
| | MPG information | |
| | Manual pulse generator information | |
| | Show MPG information | |
| | Provide MPG information | |
| | What is MPG? | |
| | What is manual pulse generator? | |
| Coach | What is ATC op panel function? | |
| | What does ATC op panel do? | |
| | Give ATC op panel information | |
| | Display ATC op panel information | |
| | Provide ATC op panel information | |
| | What is ATC op panel? | |
| | What does ATC panel do? | |
| | Give ATC panel information | |
| | Display ATC panel information | |
| | Provide ATC panel information | |
| | ATC operation panel | |
| Coach | What is APC op panel function? | |
| | What does APC op panel do? | |
| | Give APC op panel information | |

TABLE 2-continued

| Function | Expected Dialogue | Parameters |
|---|---|---|
| | Display APC op panel information | |
| | Provide APC op panel information | |
| | What is APC op panel? | |
| | What does APC panel do? | |
| | Give APC panel information | |
| | Display APC panel information | |
| | Provide APC panel information | |
| | APC operation panel | |
| Coach | What is Lift up chip conveyor? | |
| | What does Lift up chip conveyor do? | |
| | Give Lift up chip conveyor information | |
| | Display Lift up chip conveyor information | |
| | Provide Lift up chip conveyor information | |
| | What is Lift up chip conveyor panel? | |
| | What does Lift up chip conveyor panel do? | |
| | Give Lift up chip conveyor panel information | |
| | Display Lift up chip conveyor panel information | |
| | Provide Lift up chip conveyor panel information | |
| | Lift up chip conveyor operation panel | |
| Coach | How do I turn the machine on? | |
| | How do I turn the machine off? | |
| | Machine power on instructions | |
| | Machine power off instructions | |
| | Control power on instructions | |
| | Control power off instructions | |
| | Machine power instructions | |
| | Control power instructions | |
| Coach | What is preventive maintenance procedure? | |
| | Preventative maintenance instructions | |
| | What is preventative maintenance? | |
| | Give preventive maintenance information | |
| | Provide preventive maintenance information | |
| | Preventive maintenance | |
| | Regular Preventive Maintenance | |
| Coach | What is machine referencing? | |
| | How do I reference the machine? | |
| | Machine referencing information | |
| | Give information for machine reference | |
| | Provide information for machine reference | |
| | Information for machine referencing | |
| | How do I position the machine? | |
| | How to do machine reference? | |
| Coach | How do I use the machine manually? | |
| | What are the manual operations in the machine? | |
| | Manual operations information | |
| | Manual operations in the machine | |
| | Give information for manual operations | |
| | Provide information for manual operations | |
| | Information for manual operations | |
| | What are the manual operations? | |
| Coach | What are the single touch functions? | |
| | Display single touch functions | |
| | Give single touch information | |
| | Provide information for one touch functions | |
| | Single touch functions | |
| | One touch functions | |
| | What are the one touch functions? | |
| Coach | How do I use the analysis function? | |
| | Give analysis function information | |
| | Show analysis function information | |
| | Display analysis function information | |
| | Provide analysis function information | |
| | Analysis function information | |
| | What is analysis function? | |
| | How does the analysis function work? | |
| Coach | How do I use the guidance function? | |
| | Give guidance function information | |
| | Show guidance function information | |
| | Display guidance function information | |
| | Provide guidance function information | |
| | Guidance function information | |
| | What is guidance function? | |
| | How does the guidance function work? | |
| Coach | Door interlock operation modes | |
| | Give door interlocks operation modes | |

TABLE 2-continued

| Function | Expected Dialogue | Parameters |
|---|---|---|
| | Display door interlocks operation modes | |
| | Provide door interlocks operation modes | |
| | Operation modes for door interlock | |
| | What are the operation modes for door interlock? | |
| | Give operation modes for door interlock | |
| | Display operation modes for door interlock | |
| | Provide operation modes for door interlock | |
| | What are door interlocks operation modes? | |
| Coach | Give coordinate systems information | |
| | Display coordinate systems information | |
| | Provide coordinate systems information | |
| | Coordinate systems information | |
| | Provide coordinate systems | |
| | What are coordinate systems? | |
| Coach | What is program zero? | |
| | How do I find program zero? | |
| | How do I use program zero? | |
| | Give program zero information | |
| | Display program zero information | |
| | Program zero information | |
| | Absolute zero information | |
| | How do I find absolute zero? | |
| | How do I use absolute zero? | |
| | Give absolute zero information | |
| | Display absolute zero information | |
| Coach | What is work offset entry method? | |
| | How do I enter work offset? | |
| | Work offset entry method | |
| | Display work offset entry method | |
| | Give work offset entry method | |
| Coach | How to load and unload tools | |
| | How to load tools | |
| | How to unload tools | |
| | Give tool load information | |
| | Give tool unload information | |
| | Display tool unload information | |
| | Display tool load information | |
| | Provide tool load information | |
| | Provide tool unload information | |
| | Tool unload information | |
| | Tool load information | |
| Coach | What are tool offset settings? | |
| | How do I set the tool offsets? | |
| | Tool offset setting information | |
| | Give tool offset settings | |
| | Display tool offset settings | |
| Coach | How do I unlock the memory? | |
| | What is memory unlock? | |
| | Memory unlock information | |
| | Give memory unlock information | |
| | Display memory unlock information | |
| Coach | How to transfer programs | |
| | How do I transfer data? | |
| | Programs transfer information | |
| | Data transfer information | |
| | Provide data transfer information | |
| Coach | How to delete program | |
| | How do I delete a program? | |
| | What are the steps to delete a program? | |
| | Information for deleting a program | |
| | Provide information for deleting a program | |
| Coach | How to edit a program | |
| | How do I edit a program? | |
| | What are the steps to edit a program? | |
| | Information for editing a program | |
| | Provide information for editing a program | |
| Coach | What are the operations in MDI mode? | |
| | Give MDI operations | |
| | Display MDI operations | |
| | Provide MDI operations | |
| | MDI operations | |
| | What are manual data input operations? | |
| | Give manual data input operations | |
| | Display manual data input operations | |
| | Provide manual data input operations | |
| | Manual data input operations | |

TABLE 2-continued

| Function | Expected Dialogue | Parameters |
|---|---|---|
| Coach | What are the operations in memory mode? <br> Give memory mode operations <br> Display memory mode operations <br> Provide memory mode operations <br> Memory mode operations <br> What are memory mode operations? | |
| Coach | What are the operations in DNC mode? <br> Give DNC mode operations <br> Display DNC mode operations <br> Provide DNC mode operations <br> DNC mode operations <br> What are DNC mode operations? <br> What are the operations in direct numerical control mode? <br> Give direct numerical control mode operations <br> Display direct numerical control mode operations <br> Provide direct numerical control mode operations <br> Direct numerical control mode operations <br> What are direct numerical control mode operations? | |
| Control | yes <br> ok <br> no <br> cancel | |
| Control | Remove spindle tool. <br> Empty spindle. <br> Empty the spindle tool. <br> Empty the spindle <br> Empty spindle tool | |
| Control | Turn the coolant off. <br> Turn off the coolant <br> Stop the coolant. <br> Pause the coolant. <br> Disable coolant. <br> Coolant off. <br> Coolant stop. <br> Turn coolant off. <br> Turn off all coolants | |
| Control | Turn off the spindle. <br> Turn the spindle off <br> Stop the spindle. <br> Stop spindle rotation. <br> Spindle off. <br> Spindle stop. | |
| Control | Clamp the spindle tool <br> Spindle clamp <br> Hold the tool <br> Clamp the tool <br> Clamp tool | |
| Control | Unclamp the spindle tool. <br> Unclamp tool. <br> Release the tool. <br> Unclamp spindle <br> Unclamp the tool <br> Unclamp the tool from the spindle | |
| Control | Auto Zero <br> Return to origin <br> Return to zero position <br> Run auto zero | |
| Control | Warm up the machine <br> Begin warm up cycle <br> Start warm up cycle <br> Start warm up program | |
| Control | Clear screen <br> Please clear screen <br> Clean up the screen <br> I need the screen cleared <br> Clear the display <br> Clear the screen <br> Clear display | |
| Control | Feed Hold <br> Pause the program <br> Pause the cycle <br> Pause machine <br> Machine stop | |

TABLE 2-continued

| Function | Expected Dialogue | Parameters |
|---|---|---|
| | Stop machine | |
| | Stop | |
| | Pause | |
| Control | Turn the lights on | |
| | Lights on | |
| | Turn on the lights | |
| | Work light on | |
| Control | Turn the lights off | |
| | Lights off | |
| | Turn off the lights | |
| | Work light off | |
| Control | Verify all door interlock status | |
| | Check all door interlocks | |
| | Verify interlocks are secure. | |
| | Is the machine in safe mode? | |
| | Verify all interlocks are satisfied. | |
| Control | Back up NC programs. | |
| | Back up NC programs in controller | |
| | Back up programs | |
| | Back up the programs | |
| | Back up the NC programs in controller. | |
| Control | Spindle orient | |
| | Orient the spindle | |
| | Do spindle orient | |
| | Orient spindle | |
| Control | Set z axis neglect | |
| | z axis neglect | |
| | Enable z axis neglect | |
| | z axis retract | |
| | Neglect z axis | |
| | Retract z axis | |
| Control | Alarm reset | |
| | Reset alarm | |
| | Reset the alarm | |
| Control | Run Set Up Position | |
| | Setup position | |
| | Return to setup position | |
| | Go to setup position | |
| Control | Back up the machine | |
| | Back up everything | |
| | Back up the entire machine | |
| | Back up the whole machine | |
| | Back it all up | |
| | Please back up the machine | |
| Control | Restore the machine | |
| | Restore the entire machine | |
| | Please restore the machine | |
| | Restore everything | |
| Control | Back up tool data | |
| | Back up tools | |
| | Back up the tool data | |
| Control | Back up parameter data | |
| | Back up the parameter data | |
| | Back up the parameters | |
| Control | Restore NC programs | |
| | Restore programs | |
| | Restore all programs | |
| Control | Restore tool data | |
| | Restore the tool data | |
| Control | Restore the parameter data | |
| | Restore parameter data | |
| | Restore the parameters | |
| | Restore all parameters | |
| Control | Warm up the spindle | |
| | Warm up spindle | |
| | Spindle warm up | |
| | Do the spindle warm up | |
| Report | Show me alarm history report | |
| | Alarm history report | |
| | Display alarm history | |
| | What is the alarm history? | |
| | Provide alarm history | |
| | Show me alarm history | |
| Report | Report machine offset history | |
| | Show machine offset history | |
| | Give machine offset history | |
| | Machine offset history | |

TABLE 2-continued

| Function | Expected Dialogue | Parameters |
|---|---|---|
| Report | What is my current work order?<br>Running work order<br>Tell me my current work order<br>Current work order | |
| Report | What is my next work order?<br>Next work order<br>Tell me next work order<br>Give me next work order<br>Provide next work order | |
| Report | Report overrides<br>May I have all overrides?<br>Give all overrides<br>Display all overrides<br>State all overrides | |
| Report | Report rapid override<br>Report rapid rate override<br>Rapid override<br>Give rapid override<br>Provide rapid override | |
| Report | Report feedrate override<br>Feed override<br>Give feed override<br>Provide feed override | |
| Report | Report spindle override<br>Spindle override<br>Give spindle override<br>Provide spindle override | |
| Report | Contact information for support service.<br>Support service information.<br>Support service contact information<br>Support service<br>Support information | |
| Report | Display the tool data table<br>Show the tool data table<br>Tool data table<br>Tool data<br>Give me tool data table | |
| Report | Report peak spindle load<br>Report the peak spindle load.<br>Provide peak spindle load<br>Give me the peak spindle load.<br>What is the peak spindle load?<br>Peak spindle load. | |
| Report | What is the current table pallet?<br>Show me the current table pallet<br>What is the table pallet?<br>What is the current pallet? | |
| Report | Previous cycle time for current part<br>Last cycle time for current part<br>What was the last cycle time for current part? | |
| Report | Report current spindle speed<br>Current spindle speed<br>Give me current spindle speed<br>What is the current spindle speed?<br>What is the spindle speed?<br>Provide current spindle speed | |
| Report | State current feed speed<br>What is the current feedrate?<br>Give me the current feedrate.<br>Current feedrate.<br>Report current feedrate. | |
| Report | State the current part number running<br>What is the current part number running?<br>Current part number<br>Running part number<br>Part in process | |
| Report | Empty slots in magazine<br>What tool positions in the magazine are empty?<br>Empty positions in magazine<br>What are the empty positions in magazine?<br>What are the empty slots in magazine?<br>Empty pot numbers | |

TABLE 2-continued

| Function | Expected Dialogue | Parameters |
|---|---|---|
| Report | How many tools are in the magazine?<br>How many pots are used in the magazine?<br>Tell me how many tools are in the magazine<br>What are the tools in the magazine?<br>Tools in magazine. | |
| Report | Tell me the current machine status<br>Current machine status<br>What is the machine status?<br>Give me the machine status<br>Machine status | |
| Report | What tool is in the spindle?<br>What is the current tool?<br>Tell me the current tool in the spindle<br>Current spindle tool. | |
| Report | What program is running?<br>Current running program<br>What is the current running program?<br>Which program is running? | |
| Report | How many tools are in warning?<br>Total tools in warning<br>Total tool warnings | |
| Report | How many tools are in alarm?<br>Total tools in alarm<br>Total tool alarms | |
| Report | How many machine warnings are there?<br>Total machine warnings | |
| Report | How many machine alarms are there?<br>Total machine alarms | |
| Report | What tools are in warning?<br>Which tools are in warning?<br>Report which tools are in warning<br>Report what tools are in warning<br>Tools in warning<br>List tools in warning | |
| Report | What tools are in alarm?<br>Which tools are in alarm?<br>Report which tools are in alarm<br>Report what tools are in alarm<br>Tools in alarm<br>List tools in alarm | |
| Report | What are the current machine warnings?<br>Report machine warnings<br>What are the machine warnings?<br>Machine warnings<br>List machine warnings | |
| Report | What are the current machine alarms?<br>Report machine alarms<br>What are the machine alarms?<br>Machine alarms<br>List machine alarms | |
| Report | Report tool in the spindle<br>Report current tool<br>Inform about current tool<br>State of current tool<br>Data on current tool | |
| Report | Last run time of program<br>Report execution time of the last NC program.<br>Report the cycle time of NC program<br>Program last run time | |
| Report | Available pots in magazine<br>How many more tools can my magazine hold?<br>How many pots are available in the magazine?<br>How many empty pots does my ATC magazine have? | |
| Report | What tool is in ready position?<br>Which tool is in ready position?<br>Tool in ready position | |
| Report | Report the pallet ready state.<br>Is pallet ready?<br>Report current pallet ready state<br>Current pallet state<br>Pallet state<br>What is pallet ready state?<br>What is current pallet state? | |

TABLE 2-continued

| Function | Expected Dialogue | Parameters |
|---|---|---|
| Report | Report the maintenance list<br>Show maintenance list<br>Give maintenance list<br>Display maintenance list<br>What maintenance needs to be done?<br>What maintenance do I need to do?<br>Provide maintenance report | |
| Report | Report back data log for crashes<br>Log for crashes<br>Crash log | |
| Report | Is the machine warmed up?<br>Is the spindle ready? | |
| Report | What is the pallet on load station?<br>Show me the pallet on load station<br>Which pallet is on load station?<br>Which pallet is on the load station?<br>Pallet on load station | |
| Report | Display program list<br>Display the program list<br>Show me the program list<br>Show program list<br>Open program list<br>List the programs<br>Report program list | |
| Report | What is the most common alarm?<br>Tell me the most common alarm<br>Give me the most common alarm<br>Provide the most common alarm<br>What alarm happens the most?<br>Most frequent alarm | |
| Report | Report Spindle Load<br>Show spindle load report<br>Create spindle load report<br>Give me spindle load<br>Display spindle load<br>What is the spindle load? | |
| Report | Report machine utilization rate<br>What is machine utilization rate?<br>Machine utilization rate<br>Give me machine utilization rate | |
| Control | Turn Wire Standby on<br>Turn Wire Standby button on<br>Turn on Wire Standby button<br>Turn on Wire Standby<br>Activate Wire Standby<br>Wire Standby on<br>Wire Standby activate | |
| Control | Start thread<br>Begin thread<br>Start Wire Thread<br>Begin Wire Thread<br>Begin AWT<br>Start AWT | |
| Control | Stop Thread<br>Stop Thread now<br>Halt Thread<br>Pause Thread<br>Suspend Thread | |
| Control | Resume Thread<br>Restart Thread<br>Continue Thread<br>Resume Wire Thread.<br>Restart Wire Thread.<br>Continue Wire Thread<br>Resume AWT<br>Restart AWT<br>Continue AWT | |
| Control | Turn negative Z limit on<br>Turn on negative Z limit<br>Activate negative Z limit<br>Negative Z limit on<br>Negative Z limit activate<br>Set negative Z limit<br>Limit negative Z | |
| Control | Turn positive Z limit on<br>Turn on positive Z limit<br>Activate positive Z limit<br>Positive Z limit on | |

TABLE 2-continued

| Function | Expected Dialogue | Parameters |
|---|---|---|
| | Positive Z limit activate | |
| | Set positive Z limit | |
| | Limit positive Z | |
| Control | Turn negative X limit on | |
| | Turn on negative X limit | |
| | Activate negative X limit | |
| | Negative X limit on | |
| | Negative X limit activate | |
| | Set negative X limit | |
| | Limit negative X | |
| Control | Turn positive X limit on | |
| | Turn on positive X limit | |
| | Activate positive X limit | |
| | Positive X limit on | |
| | Positive X limit activate | |
| | Set positive X limit | |
| | Limit positive X | |
| Control | Turn negative Y limit on | |
| | Turn on negative Y limit | |
| | Activate negative Y limit | |
| | Negative Y limit on | |
| | Negative Y limit activate | |
| | Set negative Y limit | |
| | Limit negative Y | |
| Control | Turn positive Y limit on | |
| | Turn on positive Y limit | |
| | Activate positive Y limit | |
| | Positive Y limit on | |
| | Positive Y limit activate | |
| | Set positive Y limit | |
| | Limit positive Y | |
| Control | Turn Optional Stop on. | |
| | Turn on Optional Stop. | |
| | Activate Optional Stop. | |
| | Optional Stop on. | |
| | Optional Stop activate. | |
| | Turn Op Stop on. | |
| | Turn on Op Stop. | |
| | Activate Op Stop. | |
| | Op Stop on. | |
| | Op Stop activate. | |
| Control | Drain Tank. | |
| | Deactivate Tank Fill. | |
| | Tank Fill off. | |
| | Tank Fill deactivate. | |
| | Drain Water. | |
| | Drain fluid. | |
| | Drain tank. | |
| | Open the Drain. | |
| | Drain the tank. | |
| Control | Start hole center. | |
| | Start hole pickup. | |
| | Perform hole pickup. | |
| | Perform hole center pickup. | |
| Control | All Work Set | |
| | Work set active position | |
| | Work coordinates set | |
| | Zero active work coordinates | |
| | Zero work coordinates | |
| Control | Cut wire | |
| | Cut the wire | |
| | Wire cut | |
| | Break the wire | |
| | Break wire | |
| Control | Work Zero Return. | |
| | Turn Work Zero Return on. | |
| | Turn on Work Zero Return. | |
| | Activate Work Zero Return. | |
| | Work Zero Return on. | |
| | Work Zero Return activate. | |
| | Move to work zero. | |
| Control | Turn Low Jet Select on. | |
| | Turn on Low Jet Select. | |
| | Activate Low Jet Select. | |
| | Low Jet Select on. | |
| | Low Jet Select activate. | |
| | Set Low Jet Select. | |
| | Low Jet Select. | |

TABLE 2-continued

| Function | Expected Dialogue | Parameters |
|---|---|---|
| Control | Turn Jet on<br>Turn on Jet<br>Activate Jet<br>Jet on<br>Jet activate | |
| Control | Unspool Wire<br>Unspool Wire on<br>Turn Unspool Wire on<br>Turn on Unspool Wire<br>Activate Unspool Wire<br>Unspool Wire activate | |
| Control | Touch check<br>Turn Touch Check on<br>Turn on Touch Check<br>Activate Touch Check<br>Touch Check on<br>Touch Check activate | |
| Control | Tank fill<br>Turn on Tank Fill<br>Activate Tank Fill<br>Tank Fill on<br>Tank Fill activate<br>Fill water<br>Fill fluid<br>Fill tank<br>Fill the tank | |
| Control | Pumps Off<br>Activate Pumps Off<br>Set Pumps Off<br>Turn the Pumps Off<br>Turn Pumps Off<br>Deactivate pumps | |
| Control | Ion Off<br>Activate Ion Off<br>Set Ion Off<br>Turn the Ion Off<br>Turn Ion Off<br>Deactivate Ion | |
| Control | Wire Feed<br>Wire Feed on<br>Wire Feed activate<br>Turn Wire Feed on<br>Turn on Wire Feed<br>Activate Wire Feed<br>Set Wire Feed | |
| Control | Wire Draw Out<br>Wire Draw Out on<br>Wire Draw Out activate<br>Turn Wire Draw Out on<br>Turn on Wire Draw Out<br>Activate Wire Draw Out<br>Set Wire Draw Out | |
| Control | Single Block<br>Single Block on<br>Single Block activate<br>Turn Single Block on<br>Turn on Single Block<br>Activate Single Block<br>Set Single Block | |
| Control | Hi-Accuracy AWT<br>Turn Hi-Accuracy AWT on<br>Turn on Hi-Accuracy AWT<br>Activate Hi-Accuracy AWT<br>Hi-Accuracy AWT on<br>Hi-Accuracy AWT activate<br>Set Hi-Accuracy AWT | |
| Control | Reset machine<br>Reset the machine<br>Machine reset<br>Full machine reset | |
| Control | X Work Set<br>Set X Work<br>X Set | |
| Control | Y Work Set<br>Set Y Work<br>Y Set | |

TABLE 2-continued

| Function | Expected Dialogue | Parameters |
|---|---|---|
| Control | Z Work Set<br>Set Z Work<br>Z Set | |
| Control | X divided by 2 work set<br>X divided by 2 set<br>Set X divided by 2 work | |
| Control | Y divided by 2 work set<br>Set Y divided by 2 Work<br>Y divided by 2 set | |
| Control | XY Work Set<br>Set XY Work<br>XY Set | |
| Control | Start Position Return<br>Turn Start Position Return on<br>Turn on Start Position Return<br>Activate Start Position Return<br>Start Position Return on<br>Start Position Return activate<br>Return to start position<br>Return to starting position | |
| Control | M6 Shift Return<br>Turn M6 Shift Return on<br>Turn on M6 Shift Return<br>Activate M6 Shift Return<br>M6 Shift Return on<br>M6 Shift Return activate | |
| Control | Vertical Alignment<br>Turn Vertical Alignment on<br>Turn on Vertical Alignment<br>Activate Vertical Alignment<br>Vertical Alignment on<br>Vertical Alignment activate<br>Set Vertical Alignment | |
| Control | Go to Preparation Screen<br>Navigate to Preparation Screen<br>Switch to Preparation Screen<br>Open Preparation Screen<br>Preparation Screen<br>Go to prep screen<br>Prep screen | |
| Control | Go to Machining Preparation Screen<br>Navigate to Machining Preparation Screen<br>Switch to Machining Preparation Screen<br>Open Machining Preparation Screen<br>Machining Preparation Screen<br>Go to Machining Prep Screen<br>Machining Prep Screen | |
| Control | Go to Calibration Screen<br>Navigate to Calibration Screen<br>Switch to Calibration Screen<br>Open Calibration Screen<br>Calibration Screen | |
| Control | Go to Compensation Screen<br>Navigate to Compensation Screen<br>Switch to Compensation Screen<br>Open Compensation Screen<br>Compensation Screen | |
| Control | Go to Program Screen<br>Navigate to Program Screen<br>Switch to Program Screen<br>Open Program Screen<br>Program Screen | |
| Control | Go to Setup Screen<br>Navigate to Setup Screen<br>Switch to Setup Screen<br>Open Setup Screen<br>Setup Screen | |
| Control | Go to Measure Screen<br>Navigate to Measure Screen<br>Switch to Measure Screen<br>Open Measure Screen<br>Measure Screen | |
| Control | Go to run screen<br>Navigate to run screen<br>Switch to run screen<br>Open run screen<br>Run screen | |

TABLE 2-continued

| Function | Expected Dialogue | Parameters |
|---|---|---|
| Control | Go to Record Screen<br>Navigate to Record Screen<br>Switch to Record Screen<br>Open Record Screen<br>Record Screen | |
| Control | Go to Execution History Screen<br>Navigate to Execution History Screen<br>Switch to Execution History Screen<br>Open Execution History Screen<br>Execution History Screen | |
| Control | Go to E Number History Screen<br>Navigate to E Number History Screen<br>Switch to E Number History Screen<br>Open E Number History Screen<br>E Number History Screen | |
| Control | Go to Machining History Screen<br>Navigate to Machining History Screen<br>Switch to Machining History Screen<br>Open Machining History Screen<br>Machining History Screen | |
| Control | Go to Running Time Screen<br>Navigate to Running Time Screen<br>Switch to Running Time Screen<br>Open Running Time Screen<br>Running Time Screen | |
| Control | Go to Maintenance Screen<br>Navigate to Maintenance Screen<br>Switch to Maintenance Screen<br>Open Maintenance Screen<br>Maintenance Screen | |
| Control | Go to Option Screen<br>Navigate to Option Screen<br>Switch to Option Screen<br>Open Option Screen<br>Option Screen | |
| Control | Select Hole Center<br>Hole Center<br>Switch to Hole Center<br>Setup Hole Center<br>Pick up Hole Center<br>Start Hole Center | |
| Control | Select Edge Find<br>Edge Find<br>Switch to Edge Find<br>Setup Edge Find<br>Pick up Edge Find<br>Start Edge Find | |
| Control | Select Corner Find<br>Corner Find<br>Switch to Corner Find<br>Setup Corner Find<br>Pick up Corner Find<br>Start Corner Find | |
| Control | Select 3 Points Round<br>3 Points Round<br>Switch to 3 Points Round<br>Setup 3 Points Round<br>Pick up 3 Points Round<br>Start 3 Points Round | |
| Control | Select Work Rotate<br>Work Rotate<br>Switch to Work Rotate<br>Setup Work Rotate<br>Pick up Work Rotate<br>Start Work Rotate | |
| Control | Select 2 Holes Center<br>2 Holes Center<br>Switch to 2 Holes Center<br>Setup 2 Holes Center<br>Pick up 2 Holes Center<br>Start 2 Holes Center | |
| Control | Select Plate Width<br>Plate Width<br>Switch to Plate Width<br>Setup Plate Width<br>Pick up Plate Width | |
| Control | Select Plane Find 3D<br>Plane Find 3D | |

TABLE 2-continued

| Function | Expected Dialogue | Parameters |
|---|---|---|
| | Switch to Plane Find 3D | |
| | Setup Plane Find 3D | |
| | Pick up Plane Find 3D | |
| | Start Plane Find 3D | |
| Control | Activate Autoscale | |
| | Start Autoscale | |
| | Autoscale | |
| | Run Autoscale | |
| | Autoscale Graphics | |
| | Autoscale Program | |
| Control | Go to Program File | |
| | Navigate to Program File | |
| | Switch to Program File | |
| | Program File | |
| Control | I would like to close NC program | |
| | Close NC program | |
| | Close program | |
| | Close the program | |
| | I would like to save NC program. | |
| | Save NC program. | |
| | Save program. | |
| Control | Work tank down | |
| | Move work tank down | |
| | Tank down | |
| | Move tank down | |
| | Work tank door down | |
| | Move work tank door down | |
| | Tank door down | |
| Control | Turn Jet off | |
| | Turn off Jet | |
| | Deactivate Jet | |
| | Jet off | |
| | Jet deactivate | |
| Control | Go to Program Check | |
| | Navigate to Program Check | |
| | Switch to Program Check | |
| | Start Program Check | |
| | Program Check | |
| | Run Program Check | |
| | Check Program | |
| Report | What is the remaining wire on the spool? | |
| | How much wire is remaining? | |
| | How much wire is remaining on the spool? | |
| | What is the wire remain amount? | |
| | How much wire is left on the spool? | |
| | How much wire is left? | |
| | What is the amount of wire remaining? | |
| | What is the amount of wire remaining on the spool? | |
| Report | What is the current flushing pressure? | |
| | What is the flushing pressure? | |
| | What is the fluid pressure? | |
| | What is the current fluid pressure? | |
| | Fluid pressure | |
| | Flushing pressure | |
| | What is the status of flushing? | |
| Report | What is the setting estimated feedrate? | |
| | What is the estimated feedrate? | |
| | Estimate feedrate. | |
| | What is the setting estimated speed? | |
| | What is the estimated speed? | |
| | Estimate speed. | |
| Report | What is the setting Flushing Pressure? | |
| | Flushing Pressure | |
| Report | What is the setting Filter Pressure? | |
| | What is the Filter Pressure? | |
| | Filter Pressure | |
| Report | What is the Estimated Cycle Time? | |
| | What is the Estimated Time? | |
| | Estimate Cycle Time | |
| | Estimate Time | |
| | How long is the cycle time estimate? | |
| | How long is the time estimate? | |
| Report | How much wire will this program use? | |
| | How much wire is consumed? | |
| | How much wire is used? | |
| | What is the estimate wire consumption? | |
| | Estimate wire consumption. | |

TABLE 2-continued

| Function | Expected Dialogue | Parameters |
|---|---|---|
| Report | What is the time to Next Stop? How much time until the Next Stop? When is the Next Stop? When will the machine Stop? | |
| Report | Tell me the current machine status. Current machine status What is the machine status? Give me the machine status. Machine status. | |

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for using an intelligent industrial assistant, comprising:

receiving, by at least one device, activity data based on ethnographically studying at least one user of a group of users having a role associated with an industrial machine, the at least one device remote from the industrial machine;

generating, by the at least one device, at least one dialogue template based on the activity data from ethnographically studying the at least one user of the group of users having the role associated with the industrial machine, each dialogue template comprising a mapping based on a respective ethnographic relationship of at least one ethnographic relationship associating at least one function performable by an intelligent industrial assistant and at least one task determined based on the activity data from ethnographically studying the at least one user of the group of users having the role associated with the industrial machine, one or more of the at least one dialogue template comprising at least one alternative item of expected dialogue based on a corpus of vocabulary including technically-alike meanings in relation to the industrial machine based on the at least one ethnographic relationship;

generating, by the at least one device, package data comprising the at least one dialogue template;

installing, on the intelligent industrial assistant, the package data from the at least one device, the intelligent industrial assistant directly connected to the industrial machine;

receiving, by the intelligent industrial assistant, a natural language input from a user of the group of users having the role;

mapping, by the intelligent industrial assistant, at least a portion of the natural language input to a first dialogue template of the at least one dialogue template, the first dialogue template comprising a first mapping based on a first ethnographic relationship associating the activity data associated with the role of the user; at least one first task based on the activity data; at least one of the industrial machine or a database associated with the at least one first task; a dialogue sequence based on the at least one first task and the at least one of the industrial machine or the database; at least one first function performable by the intelligent industrial assistant based on the at least one first task, the at least one of the industrial machine or the database, and the dialogue sequence; and at least one action based on the at least one first function;

determining, by the intelligent industrial assistant, at least one command based on the at least one action of the first dialogue template; and communicating, by the intelligent industrial assistant, command data associated with the at least one command to the at least one of the industrial machine or the database associated with the first dialogue template.

2. The method of claim 1, further comprising:

receiving, by the intelligent industrial assistant, response data in response to the command data; and communicating, by the intelligent industrial assistant, a response to the user based on the response data.

3. The method of claim 2, further comprising:

displaying, by a user device, a dialogue window, the dialogue window comprising text of the natural language input and text of the response.

4. The method of claim 1, wherein the package data further comprises at least one industrial machine interface including a first industrial machine interface for a first industrial machine, wherein the first dialogue template is associated with at least one executable industrial machine operation, wherein the command data is associated with the at least one executable industrial machine operation, and wherein communicating the command data comprises transmitting, by the intelligent industrial assistant, the command data via the first industrial machine interface to the first industrial machine.

5. The method of claim 1, wherein the package data further comprises at least one database interface including a first database interface for a first database, wherein the first dialogue template is associated with retrievable data, wherein the command data is associated with the retrievable data, and wherein communicating the command data comprises transmitting, by the intelligent industrial assistant, the command data via the first database interface to the first database.

6. The method of claim 1, wherein the at least one dialogue template comprises a plurality of dialogue templates, the method further comprising:

selecting, by the intelligent industrial assistant, the first dialogue template from the plurality of dialogue templates based on the natural language input.

7. The method of claim 1, further comprising:
determining, by the intelligent industrial assistant, the natural language input is insufficient to map to a portion of the first dialogue template;
communicating, by the intelligent industrial assistant, a prompt requesting additional input to the user;
receiving, by the intelligent industrial assistant, a second natural language input form the user;
mapping, by the intelligent industrial assistant, at least a portion of the second natural language input to the portion of the first dialogue template.

8. The method of claim 1, further comprising:
communicating, by the intelligent industrial assistant, a prompt requesting confirmation for the at least one command to the user based on the first dialogue template;
receiving, by the intelligent industrial assistant, a second natural language input from the user; and
determining, by the intelligent industrial assistant, the user has confirmed the at least one command based on the second natural language input.

9. The method of claim 1, wherein the package data further comprises at least one of a media item, a tabular list, a report template, a machine interface, a database interface, or a combination thereof.

10. The method of claim 9, wherein the media item comprises at least one of a user manual, a video recording, an audio recording, or a combination thereof.

11. The method of claim 10, wherein the user manual comprises a plurality of media markers, wherein the first dialogue template is associated with at least one media marker of the plurality of media markers, wherein the command data is associated with the at least one media marker of the plurality of media markers, and wherein communicating the command data comprises transmitting, by the intelligent industrial assistant, the command data to a user device to display the at least one media marker of the user manual.

12. The method of claim 9, wherein the package data comprises the tabular list, wherein the first dialogue template is associated with at least one field of the tabular list, wherein the command data is associated with the at least one field of the tabular list, and wherein communicating the command data comprises transmitting, by the intelligent industrial assistant, the command data to a user device to display the at least one field of the tabular list.

13. The method of claim 9, wherein the package data comprises a first industrial machine interface of a first industrial machine, wherein the first industrial machine interface comprises an application programming interface (API) associated with a dynamic load library (DLL) of the first industrial machine.

14. The method of claim 9, wherein the package data comprises a first report template, and wherein the first report template comprises at least one of a history field, a filtering field, a statistics field, a calculation field, a warning field, an alarm field, a machine status field, or a combination thereof.

15. The method of claim 1, wherein the at least one of the industrial machine or the database comprises a first industrial machine, the first ethnographic relationship of the dialogue template further associating at least one machine feature of the first industrial machine based on the at least one first task, at least one machine warning of the first industrial machine based on the at least one first task and the at least one machine feature, and at least one possible machine response of the first industrial machine based on the at least one first task, the at least one machine feature, and the at least one machine warning.

16. The method of claim 15, wherein the dialogue sequence is based on the at least one first task, the at least one machine feature, the at least one machine warning, and the at least one possible machine response.

17. The method of claim 16, wherein the at least one first function performable by the intelligent industrial assistant is based on the at least one first task, the at least one machine feature, the at least one machine warning, the at least one possible machine response, and the dialogue sequence.

18. A system for using an intelligent industrial assistant, comprising:
at least one device configured to:
receive activity data based on ethnographically studying at least one user of a group of users having a role associated with an industrial machine, the at least one device remote from the industrial machine;
generate at least one dialogue template based on the activity data from ethnographically studying the at least one user of the group of users having the role associated with the industrial machine, each dialogue template comprising a mapping based on a respective ethnographic relationship of at least one ethnographic relationship associating at least one function performable by an intelligent industrial assistant and at least one task determined based on the activity data from ethnographically studying the at least one user of the group of users having the role associated with the industrial machine, one or more of the at least one dialogue template comprising at least one alternative item of expected dialogue based on a corpus of vocabulary including technically-alike meanings in relation to the industrial machine based on the at least one ethnographic relationship;
generate package data comprising the at least one dialogue template; and
the intelligent industrial assistant configured to:
install, on the intelligent industrial assistant, the package data from the at least one device, the intelligent industrial assistant directly connected to the industrial machine;
receive, via a dialogue manager of the intelligent industrial assistant, a natural language input from a user of the group of users having the role;
map, by a decision engine of the intelligent industrial assistant, at least a portion of the natural language input to a first dialogue template of the at least one dialogue template, the first dialogue template comprising a first mapping based on a first ethnographic relationship associating the activity data associated with the role of the user; at least one first task based on the activity data; at least one of the industrial machine or a database associated with the at least one first task; a dialogue sequence based on the at least one first task and the at least one of the industrial machine or the database; at least one first function performable by the intelligent industrial assistant based on the at least one first task, the at least one of the industrial machine or the database, and the dialogue sequence; and at least one action based on the at least one first function;
determine, by the decision engine of the intelligent industrial assistant, at least one command based on the at least one action of the first dialogue template; and communicate, by the decision engine of the intelligent industrial assistant, command data associated with the at least one command to the at least one of the industrial machine or the database associated with the first dialogue template.

19. A computer program product for using an intelligent industrial assistant, the computer program product comprising at least one non-transitory computer-readable medium including one or more instructions that, when executed by at least one processor, cause the at least one processor to:
receive activity data based on ethnographically studying at least one user of a group of users having a role associated with an industrial machine;
generate at least one dialogue template based on the activity data from ethnographically studying the at least one user of the group of users having the role associated with the industrial machine, each dialogue template comprising a mapping based on a respective ethnographic relationship of at least one ethnographic relationship associating at least one function performable by an intelligent industrial assistant and at least one task determined based on the activity data from ethnographically studying the at least one user of the group of users having the role associated with the industrial machine, one or more of the at least one dialogue template comprising at least one alternative item of expected dialogue based on a corpus of vocabulary including technically-alike meanings in relation to the industrial machine based on the at least one ethnographic relationship;
generate package data comprising the at least one dialogue template;
install, on the intelligent industrial assistant, the package data comprising the at least one dialogue template, the intelligent industrial assistant directly connected to the industrial machine;
receive, via a dialogue manager of the intelligent industrial assistant, a natural language input from a user of the group of users having the role;
map, by a decision engine of the intelligent industrial assistant, at least a portion of the natural language input to a first dialogue template of the at least one dialogue template, the first dialogue template comprising a first mapping based on a first ethnographic relationship associating the activity data associated with the role of the user; at least one first task based on the activity data; at least one of the industrial machine or a database associated with the at least one first task; a dialogue sequence based on the at least one first task and the at least one of the industrial machine or the database; at least one first function performable by the intelligent industrial assistant based on the at least one first task, the at least one of the industrial machine or the database, and the dialogue sequence; and at least one action based on the at least one first function;
determine, by the decision engine of the intelligent industrial assistant, at least one command based on the at least one action of the first dialogue template; and
communicate, by the decision engine of the intelligent industrial assistant, command data associated with the at least one command to the at least one of the industrial machine or the database associated with the first dialogue template.

* * * * *

UNITED STATES PATENT AND TRADEMARK OFFICE
CERTIFICATE OF CORRECTION

PATENT NO. : 11,232,262 B2
APPLICATION NO. : 16/513015
DATED : January 25, 2022
INVENTOR(S) : Ronald D. Bagley, Jr. et al.

It is certified that error appears in the above-identified patent and that said Letters Patent is hereby corrected as shown below:

On the Title Page

Column 1, Item (73) Assignee, Line 1, delete "IT" and insert -- iT --

In the Claims

Column 79, Line 41, Claim 1, after "relationship" insert -- specific to users of the industrial machine --

Column 82, Line 26, Claim 18, after "relationship" insert -- specific to users of the industrial machine --

Column 83, Line 20, Claim 19, after "relationship" insert -- specific to users of the industrial machine --

Signed and Sealed this
Nineteenth Day of April, 2022

Katherine Kelly Vidal
*Director of the United States Patent and Trademark Office*